United States Patent
Reimer

(10) Patent No.: US 10,015,630 B2
(45) Date of Patent: Jul. 3, 2018

(54) TRACKING PEOPLE

(71) Applicant: PROXIMITY GRID, INC., San Jose, CA (US)

(72) Inventor: John H. Reimer, San Jose, CA (US)

(73) Assignee: Proximity Grid, Inc., San Jose, CA (US)

(*) Notice: Subject to any disclaimer, the term of this patent is extended or adjusted under 35 U.S.C. 154(b) by 0 days.

(21) Appl. No.: 15/265,854

(22) Filed: Sep. 15, 2016

(65) Prior Publication Data

US 2018/0077525 A1 Mar. 15, 2018

(51) Int. Cl.
| | |
|---|---|
| H04W 24/00 | (2009.01) |
| H04W 4/02 | (2018.01) |
| H04L 29/08 | (2006.01) |
| H04L 12/26 | (2006.01) |
| H04L 12/58 | (2006.01) |

(52) U.S. Cl.
CPC ............ H04W 4/023 (2013.01); H04L 43/10 (2013.01); H04L 51/20 (2013.01); H04L 67/22 (2013.01)

(58) Field of Classification Search
None
See application file for complete search history.

(56) References Cited

U.S. PATENT DOCUMENTS

| | | | |
|---|---|---|---|
| 2,252,487 A | 8/1941 | Bevill | |
| 3,962,861 A | 6/1976 | Protta et al. | |
| 4,010,603 A | 3/1977 | Forsyth | |
| 4,903,336 A | 2/1990 | Masuhara et al. | |
| 5,539,635 A | 7/1996 | Larson, Jr. | |
| 5,732,212 A | 3/1998 | Perholtz et al. | |
| 5,867,488 A | 2/1999 | Derango et al. | |
| 5,937,413 A | 8/1999 | Hyun et al. | |
| 5,991,737 A | 11/1999 | Chen | |
| 6,029,141 A | 2/2000 | Bezos et al. | |
| 6,049,711 A | 4/2000 | Ben-Yehezkel et al. | |
| 6,397,040 B1 | 5/2002 | Titmuss et al. | |
| 6,578,047 B1 | 6/2003 | Deguchi | |

(Continued)

FOREIGN PATENT DOCUMENTS

| | | |
|---|---|---|
| WO | WO 2000/41090 A1 | 7/2000 |
| WO | WO 2001/27745 A1 | 4/2001 |

(Continued)

OTHER PUBLICATIONS

U.S. Appl. No. 60/701,551, filed Mar. 15, 2007, Reimer.

(Continued)

*Primary Examiner* — Idowu O Osifade
(74) *Attorney, Agent, or Firm* — Jennifer A. Haynes; David Lewis

(57) ABSTRACT

This specification generally relates to a method for tracking one or more persons in a relationship between a tracker and the one or more participants. The method can include using an event stamp function to activate the tracking system. The person being tracked determines when they are trackable by connecting to a proximity grid. When the person being tracked wants to be tracked, that person connects to a proximity grid, and when the person being tracked does not want to be tracked, that person disconnects from the proximity grid, thereby simplifying setting up rules for when the person being tracked can be tracked.

21 Claims, 11 Drawing Sheets

(56) References Cited

U.S. PATENT DOCUMENTS

| | | | |
|---|---|---|---|
| 6,650,534 B2 | 11/2003 | Tree | |
| 6,662,226 B1 | 12/2003 | Wang et al. | |
| 6,674,993 B1 | 1/2004 | Tarbouriech | |
| 6,829,368 B2 | 12/2004 | Meyer et al. | |
| 6,834,308 B1 | 12/2004 | Ikezoye et al. | |
| 6,904,264 B1 | 6/2005 | Frantz | |
| 6,925,489 B1 | 8/2005 | Curtin | |
| 6,970,871 B1 | 11/2005 | Rayburn | |
| 7,013,292 B1 | 3/2006 | Hsu et al. | |
| 7,031,983 B2 | 4/2006 | Israni et al. | |
| 7,058,710 B2 | 6/2006 | McCall et al. | |
| 7,099,895 B2 | 8/2006 | Dempsey | |
| 7,249,123 B2 | 7/2007 | Elder et al. | |
| 7,269,590 B2 | 9/2007 | Hull et al. | |
| 7,363,024 B2 | 4/2008 | Jenkins | |
| 7,761,400 B2 | 7/2010 | Reimer | |
| 7,809,805 B2 | 10/2010 | Stremel et al. | |
| 7,848,765 B2 | 12/2010 | Phillips et al. | |
| 7,917,576 B1 | 3/2011 | Kling | |
| RE42,927 E | 11/2011 | Want et al. | |
| 8,356,005 B2 | 1/2013 | Reimer | |
| 9,767,418 B2 | 9/2017 | Reimer | |
| 2001/0003099 A1 | 6/2001 | Von Kohorn | |
| 2001/0018858 A1 | 9/2001 | Dwek | |
| 2001/0025259 A1 | 9/2001 | Rouchon | |
| 2001/0030667 A1 | 10/2001 | Kelts | |
| 2001/0031066 A1 | 10/2001 | Meyer et al. | |
| 2001/0037303 A1 | 11/2001 | Mizrahi | |
| 2001/0037721 A1 | 11/2001 | Hasegawa et al. | |
| 2001/0053944 A1 | 12/2001 | Marks et al. | |
| 2001/0055391 A1 | 12/2001 | Jacobs | |
| 2002/0002039 A1 | 1/2002 | Qureshey et al. | |
| 2002/0002541 A1 | 1/2002 | Williams | |
| 2002/0002899 A1 | 1/2002 | Gjerdingen et al. | |
| 2002/0007354 A1 | 1/2002 | Deguchi | |
| 2002/0010641 A1 | 1/2002 | Stevens et al. | |
| 2002/0010652 A1 | 1/2002 | Deguchi | |
| 2002/0013784 A1 | 1/2002 | Swanson | |
| 2002/0016748 A1 | 2/2002 | Emodi et al. | |
| 2002/0019858 A1 | 2/2002 | Kaiser et al. | |
| 2002/0023096 A1 | 2/2002 | Deguchi | |
| 2002/0023142 A1 | 2/2002 | Michaelis et al. | |
| 2002/0042754 A1 | 4/2002 | Del Beccaro et al. | |
| 2002/0059201 A1 | 5/2002 | Work | |
| 2002/0069076 A1 | 6/2002 | Faris et al. | |
| 2002/0107016 A1 | 8/2002 | Hanley | |
| 2002/0145534 A1 | 10/2002 | Dempsey | |
| 2002/0145589 A1 | 10/2002 | Tree | |
| 2002/0145943 A1 | 10/2002 | Tree | |
| 2002/0147762 A1 | 10/2002 | Tree | |
| 2003/0028429 A1 | 2/2003 | Mittman et al. | |
| 2003/0034956 A1 | 2/2003 | Deguchi | |
| 2003/0036352 A1 | 2/2003 | Deguchi | |
| 2003/0037035 A1 | 2/2003 | Deguchi | |
| 2003/0101150 A1 | 5/2003 | Agnihotri et al. | |
| 2003/0145093 A1 | 7/2003 | Oren et al. | |
| 2003/0153264 A1 | 8/2003 | Osato et al. | |
| 2003/0222918 A1 | 12/2003 | Coulthard | |
| 2003/0225632 A1 | 12/2003 | Tong et al. | |
| 2003/0233282 A1 | 12/2003 | Ward et al. | |
| 2003/0236711 A1 | 12/2003 | Deguchi | |
| 2004/0000995 A1 | 1/2004 | Deguchi | |
| 2004/0002938 A1 | 1/2004 | Deguchi | |
| 2004/0024846 A1 | 2/2004 | Randall et al. | |
| 2004/0031045 A1 | 2/2004 | Ivanyi | |
| 2004/0088177 A1 | 5/2004 | Travis et al. | |
| 2004/0121723 A1 | 6/2004 | Poltorak | |
| 2004/0143458 A1 | 7/2004 | Pulkkinen et al. | |
| 2004/0148275 A1 | 7/2004 | Achlioptas | |
| 2005/0021750 A1 | 1/2005 | Abrams | |
| 2005/0038876 A1 | 2/2005 | Chaudhuri | |
| 2005/0050022 A1 | 3/2005 | Dukes et al. | |
| 2005/0107031 A1 | 5/2005 | Wood et al. | |
| 2005/0114759 A1 | 5/2005 | Williams et al. | |
| 2005/0136988 A1 | 6/2005 | Villamil et al. | |
| 2005/0144165 A1 | 6/2005 | Hafizullah et al. | |
| 2005/0154639 A1 | 7/2005 | Zetmeir | |
| 2005/0159970 A1 | 7/2005 | Buyukkokten et al. | |
| 2005/0171799 A1 | 8/2005 | Hull et al. | |
| 2005/0171955 A1 | 8/2005 | Hull et al. | |
| 2005/0176366 A1 | 8/2005 | Levy | |
| 2005/0177385 A1 | 8/2005 | Hull et al. | |
| 2005/0197846 A1 | 9/2005 | Pezaris et al. | |
| 2005/0198020 A1 | 9/2005 | Garland et al. | |
| 2005/0198031 A1 | 9/2005 | Pezaris et al. | |
| 2005/0198305 A1 | 9/2005 | Pezaris et al. | |
| 2005/0203807 A1 | 9/2005 | Bezos et al. | |
| 2005/0216300 A1 | 9/2005 | Appelman et al. | |
| 2005/0216550 A1 | 9/2005 | Paseman et al. | |
| 2005/0235062 A1 | 10/2005 | Lunt et al. | |
| 2005/0256756 A1 | 11/2005 | Lam et al. | |
| 2005/0279820 A1 | 12/2005 | Moynihan et al. | |
| 2006/0041543 A1 | 2/2006 | Achlioptas | |
| 2006/0042483 A1 | 3/2006 | Work et al. | |
| 2006/0048059 A1 | 3/2006 | Etkin | |
| 2006/0052091 A1 | 3/2006 | Onyon et al. | |
| 2006/0053109 A1 | 3/2006 | Sudanagunta et al. | |
| 2006/0080613 A1 | 4/2006 | Savant | |
| 2006/0085419 A1 | 4/2006 | Rosen | |
| 2006/0136419 A1 | 6/2006 | Brydon et al. | |
| 2006/0143183 A1 | 6/2006 | Goldberg et al. | |
| 2006/0161599 A1 | 7/2006 | Rosen | |
| 2006/0184617 A1 | 8/2006 | Nicholas et al. | |
| 2006/0190281 A1 | 8/2006 | Kott et al. | |
| 2006/0194186 A1 | 8/2006 | Nanda | |
| 2006/0218114 A1 | 9/2006 | Weare et al. | |
| 2006/0218225 A1 | 9/2006 | Hee Voon et al. | |
| 2006/0229063 A1 | 10/2006 | Koch | |
| 2006/0230061 A1 | 10/2006 | Sample et al. | |
| 2006/0247940 A1 | 11/2006 | Zhu et al. | |
| 2006/0248573 A1 | 11/2006 | Pannu et al. | |
| 2006/0256008 A1 | 11/2006 | Rosenberg | |
| 2006/0265227 A1 | 11/2006 | Sadamura et al. | |
| 2006/0293976 A1 | 12/2006 | Nam | |
| 2007/0030824 A1 | 2/2007 | Ribaudo et al. | |
| 2007/0167174 A1 | 7/2007 | Halcrow et al. | |
| 2007/0174389 A1 | 7/2007 | Armstrong et al. | |
| 2007/0208916 A1 | 9/2007 | Tomita | |
| 2007/0282987 A1 | 12/2007 | Fischer et al. | |
| 2008/0005076 A1 | 1/2008 | Payne et al. | |
| 2008/0010343 A1 | 1/2008 | Escaffi et al. | |
| 2008/0033776 A1 | 2/2008 | Marchese | |
| 2008/0040428 A1 | 2/2008 | Wei et al. | |
| 2008/0070697 A1 | 3/2008 | Robinson et al. | |
| 2008/0076418 A1 | 3/2008 | Beyer, Jr. | |
| 2008/0086458 A1 | 4/2008 | Robinson et al. | |
| 2008/0132243 A1 | 6/2008 | Spalink et al. | |
| 2010/0019924 A1 | 1/2010 | D'Alessandro et al. | |
| 2012/0302258 A1* | 11/2012 | Pai | H04W 4/02 455/456.2 |
| 2015/0058059 A1* | 2/2015 | Kahan | G06Q 10/1095 705/7.19 |

FOREIGN PATENT DOCUMENTS

| | | |
|---|---|---|
| WO | WO 2001/41441 A1 | 6/2001 |
| WO | WO 2002/23773 A2 | 3/2002 |
| WO | WO 2002/27600 A2 | 4/2002 |
| WO | WO 2002/073975 A1 | 9/2002 |
| WO | WO 2003/003316 A1 | 1/2003 |
| WO | WO 2003/054852 A2 | 7/2003 |

OTHER PUBLICATIONS

Title: AroundMe: iPhone Application URL: http://itunes.apple.com/us/app/aroundme/id290051590?mt=8 Date: May 5, 2011; 3 pages.
Title:Facebook: iPhone Application URL: http://itunes.apple.com/us/app/facebook/id284882215?mt=8 Date: May 5, 2011; 2 pages.
Title: Movies by One Tap: iPhone Application URL: http://itunes.apple.com/us/app/movies-by-onetap-listings/id2842494457=mt=8 Date: May 5, 2011; 2 pages.

(56) References Cited

OTHER PUBLICATIONS

Title: Movies Now HD: iPhone Application URL: http://itunes.apple.com/us/app/movies-now-hd/id374189261?mt=8 Date: May 5, 2011; 2 pages.

Title: Siri Assistant URL: http://itunes.apple.com/us/app/siri-assistant/id351778157?mt=8 Date: May 5, 2011; 2 pages.

Title: Taxi: iPhone Application URL: http://itunes.apple.com/app/taxi/id288670013?mt=8 Date: May 5, 2011; 2 pages.

Title: Yowza! Mobile Coupons: iPhone Application URL: http://itunes.apple.com/us/app/yowza-mobile-coupons/id312021877?mt=8 Date: May 5, 2011; 3 pages.

Title: Virgin Radio—The Station Song Search; URL: http://www.virginradio.co.uk/search.html, the version for which a hardcopy has been provided can be found at: http://web.archive.org/web/20050720025508/www.virginradio.co.uk/search.html, Date: Jul. 20, 2005 ; 1 page.

Title: Virgin Radio—Search Results; URL:http://web.archive.org/web/20050720025508/www.virginradio.co.uk/thestation/nowplaying/songsearch.html Date: Aug. 8, 2005; 1 page.

Title: On the Radio.Net: Songs URL: www.ontheradio.net/Songs.aspx Date: Aug. 8, 2005; 1 page.

Title: Virgin Radio—The Station—Listen to us online, URL: http://web.archive.org/web/20050720022055/www.virginradio.co.uk/thestation/listen/ Date: Jul. 20, 2005; 2 pages.

Title: MusicVoyager—Explorer's Guide to Music; URL: http://web.archive.org/web/200505202331356/http://www.musicvoyager.com Date: May 20, 2005; 4 pages.

Title: Xfm—The UK's New Music Radio Station; URL: http://www.xfm.co.uk/messageboard/Default.asp?sub=show&action=post&tid=38&tid=10 Date: Aug. 8, 2005; 1 page.

Title: Xfm—The UK's New Music Radio Station; URL: http://www.xfm.co.uk/messageboard/Default.asp?sub=show&action=post&fid=38 Date: Aug. 8, 2005; 1 page.

Title: Rockband.com: Unsigned and Indie Rock Bands; URL: http://web.archive.org/web/200507023081315 Date: Jul. 23, 2005; 1 page.

Title: Song Search—Monster Marketplace URL: www.monstermarketplace.com/googlesearch.asp?q=song%20search Date: Aug. 8, 2005; 2 pages.

Title: 102.1 Milwaukee's Alternative Station; URL: http://web.archive.org/web/20050707015215/http://www.milwaukeesalternativestation.com, Date: Jul. 20, 2005; 2 pages.

Title: Run-D.M.C.—Radio Station Lyrics URL: http://web.archive.org/web/20050319114905/http://www.lyricsdepot.com/run-d-m-c/ Date: Jul. 20, 2005; 2 pages.

Title: Music—Song Lyric Search, Reb Music URL: http://web.archive.org/web/20050513072647/http://rebmusic.com/songlyricsearch Date: Jul. 20, 2005; 6 pages.

Title: Winamp Plug-In HTPC MP3 Player Software—Jukebox for Winamp; URL: http://web.archive.org/web/20050403180214/http://www.mp3wirelessjukebox.com Date: Apr. 3, 2005; 1 page.

Title: BBC—Radio 2-Playlist; URL: http://web.archive.org/web/20050717005517/http://www.bbc.co.uk/radio2/r2music/playlist Date: Jul. 18, 2005; 1 page.

Title: Song Lyrics Search Engine URL: http://web.archive.org/web/20050720073905/http://lyricsearch.net/ Date: Jul. 20, 2005; 2 pages.

Title: Online Internet Radio Station Directory at Internetradiosearch.com URL: http://web.archive.org/web/20030812175006/www.songssearch.net Date: Aug. 12, 2005; 1 page.

Title: Replay Radio; URL: http://web.archive.org/web/20050724232936/http://www.replay-video.com/replay-radio/index.php Date: Jul. 24, 2005; 1 page.

Title: Melissa Data: AM, FM and TM Stations by Zip Code URL: http://www.melissadata.com/lookups/Fcc.asp?InData=95125&submit1=submit Date: Aug. 8, 2005.

Title: GPSMAP 76 Chartplotting Receiver, Owner's Manual and Reference Guide; URL: http://johnmischler.com/methodsdocs/MANUAL000004742.pdf Copyright 2001 GARMIN corporation; Jul. 2001; Part No. 190-00230-00 Rev. B.

Title: GPSMAP 76 Chartplotting Receiver, Owner's Manual; URL: http://static.garmin.com/pumac/GPSMAP76_OwnersManual.pdf Copyright 2006 Garmin Ltd. Or its subsidiaries; Mar. 2006; Part No. 190-00230-00 Rev. D.

\* cited by examiner

TRACKING PEOPLE

CROSS REFERENCE TO RELATED APPLICATIONS

This application incorporates by reference the following applications:

U.S. patent application Ser. No. 13/663,318, filed Oct. 29, 2012, by John Reimer, entitled, "Identifying Events,"

U.S. patent application Ser. No. 12/803,766, filed Jul. 6, 2010, by John Reimer, entitled, "Identifying Events,"

U.S. patent application Ser. No. 11/490,905, filed Jul. 21, 2006, by John Reimer, entitled, "Identifying Events," and U.S. Provisional Patent Application No. 60/701,551, filed Jul. 22, 2005, by John Reimer, entitled, "Identifying Events."

FIELD

This specification generally relates to a method for tracking one or more people.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represents different approaches, which in and of themselves may also be inventions.

An individual may want to track one or more person's locations in relation to a meeting, a working group, or a family group and under some conditions some people may be open or may find it desirable to be tracked or to be trackable by another individual. However, this specification recognizes that filling out many forms and/or answering many questions about when and how the individual being tracked is willing to be tracked is cumbersome and may be an impedance to setting the tracking relationship.

SUMMARY

The methods and systems are disclosed that allow for tracking one or more person, without creating the friction of having to fill in many fields and respond to many questions about preferences of where, when and how the user is open to being tracked.

A person may not want to be tracked all of the time and/or may want to be tracked only when that person is in a certain set of circumstances. The methods allow the person being tracked to indicate when the person being tracked in open to being tracked without being required to wade through many pages of questions while setting up the system without the tracker and the person being tracked needing to designate in advance a complex set of on rules, times, places, of when it is acceptable to be tracked, if the tracker and the person being tracked not want to. However, rules can still be agreed upon when the tracking is set up if the tracker and the person being tracked want to.

In an embodiment, in order to avoid the requirement of filling out many online forms while setting up the tracking, the person can be tracked when the person's machine sends an indication to the server that the machine of the person being tracked is on the proximity grid of the server. The current location of the person being tracked is discoverable, via a proximity gird. In an embodiment, a user considered to be on the proximity grid when the person being tracked is connected to a server that maintains the tracking information. In an embodiment, a user considered to be on the proximity grid when the person being tracked is connected to a server that maintains the tracking information. In an embodiment, a user considered to be on the proximity grid when the machine of the person being tracked maintains communication with the server, by updating the server regarding changes in the user's current location. In an embodiment, the user's machine includes a button (which may be a physical or virtual button), which when pressed connects the user's device to the server, placing the user on the proximity grid and disconnects the user from the server removing the person form the grid. In an embodiment, the connecting to the server, going on the proximity grid, is accompanied with a message being sent from the user machine to the server indicting that the user is currently on the proximity grid, and disconnecting the user from the grid in accompanies with sending a message the server indicating that the user is not on the proximity grid. In other words, the person being tracked just sends a message to the server that the person is now trackable or now untrackable, depending on the desire of the person being tracked, to change status between being trackable and being untrackable. The server may store an indicator that indicates whether the user is on or off the grid, and when the indicator indicates that the user is on the proximity grid, current tracking information is accessible to the tracker and when the indicator indicates the user is off the grid, current tracking information is not accessible to the tracker. In an embodiment, when the trackee is on the proximity grid, the user device of the trackee is in a mode in which event stamps are sent to the server having the location of the person being tracked. By "on the proximity grid," the user device of the participant has indicated to the server (e.g., by sending an event stamp), that the user device of the participant is available for being tracked. Additionally, in an embodiment, by "on the proximity grid" the participant is available for sending messages and can be contacted during that time, via the server.

For example, the user may press a button activating an event stamp (an event stamp button), or otherwise activate an event stamp function that sends the indication (sending of the event stamp itself may be the indication that the person being tracked is now trackable). Then, when the person being tracked is on the proximity grid, an event stamp function may record the time of day, the date, and the location of the person. Continuing the example, when the person being tracked no longer wants to be trackable, the person being tracked removes themselves from the grid, which may involve stopping to send updated event stamps, sending a message to the server that the person being tracked no longer want to be tracked, and/or disconnecting from the server.

In an embodiment, the location is identified, via GPS coordinates. In an embodiment, the event stamp function provides other information about the location, including the name of the establishment, the telephone number of the establishment, a map of the area, etc.

Thus, methods are provided that allow the tracker and the person being tracked having to agree upon a complex set of rules for the tracking, while ensuring that the person being tracked is only tracked when desired.

In an embodiment, an option is provided for setting up the system so that the person being tracked is pinged for the trackee's location and/or other information only when the person being tracked is on the proximity grid (as opposed to the person being tracked sending a continual stream of event stamps, for example). In this specification, the word "pinged" refers to being sent a message or signal as a request for more information (some users may only be opened to being tracked by allowing others to ping the machine being tracked for tracking information, which may then be supplied in reply to the ping). In other words, a ping refers to a message that is sent asking the recipient's/trackee's machine for tracking information or for permission to view tracking information collected at the server. The machine being pinged may have an automated reply that is only sent after being manually approved by the user of the machine being pinged or the user may need to reply manually, such as by manually sending an event stamp or another communication (e.g., a text message, phone call, or e-mail). The pinging mode allows a participant to be tracked, while allowing the trackee to keep as much of the tracking information as desired. User's may receive alerts (e.g., the user's phone may vibrate) when in proximity to someone being tracked.

In an embodiment, activating the event stamp function allows the system to identify the location of the person that activated the event stamp function, based on the location of the person's mobile phone, laptop, tablet, computer or other trackable device.

If the person being tracked never removes themselves from the grid, the tracking can be performed continuously. The users may also be provided with, fields (that are not required to be filled out) for selecting options, tracking during a certain time period (e.g., an employee during working hours), for setting up complex rules of when the tracking occurs, which may afterwards be carried out by default, unless one of the users actively intervenes to alter when the tracking occurs.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-4 is a brief description of each element, which may have no more than the name of each of the elements in the one of FIGS. 1-4 that is being discussed. After the brief description of each element, each element is further discussed in numerical order. In general, each of FIGS. 1-9 is discussed in numerical order and the elements within FIGS. 1-9 are also usually discussed in numerical order to facilitate easily locating the discussion of a particular element. Nonetheless, there is no one location where all of the information of any element of FIGS. 1-9 is necessarily located. Unique information about any particular element or any other aspect of any of FIGS. 1-9 may be found in, or implied by, any part of the specification.

Figure 1:
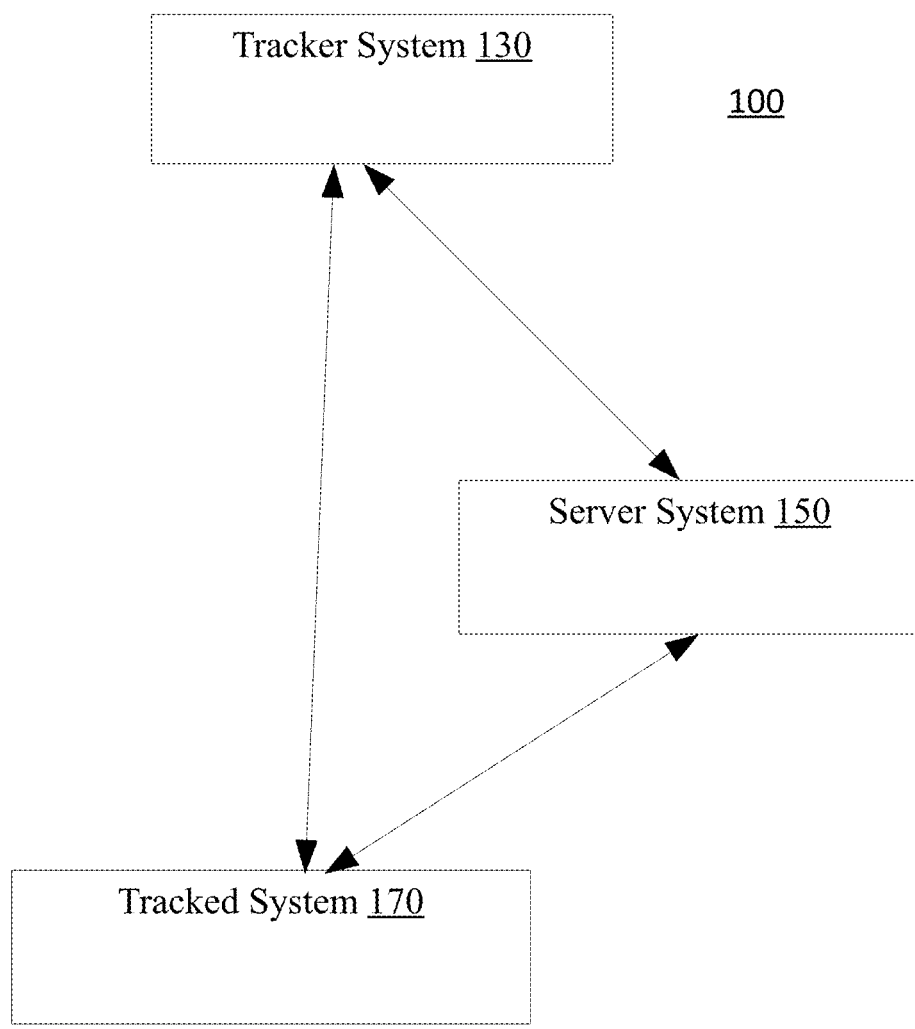
FIG. 1 shows a block diagram of a system for tracking.

FIG. 1 shows a block diagram of communication between modules used in tracking system 100. Communications for tracking system 100 may include a tracker system 110, a server system 150, and a tracked system 170. In other embodiments, communications for tracking system 100 may not include all of the components and/or may include other components, in addition to, and/or instead of the components listed above.

Tracker system 110 is the system of the user that performs the tracking. Tracker system 110 may be a computer, a smartphone, a smartwatch, a laptop, or a tablet or any type of electronic device that has the capabilities to perform the functions of a method of tracking. Tracking may involve use of an event stamp or tracking may not involve the use of an event stamp. Tracking a participant is keeping track of the participant's whereabouts, location, and/or activities. An event stamp is function that automatically, when activated, collects information about an event. The remainder of this paragraph elaborate on event stamps, which may be used in other parts of the system 100. In an embodiment, each time a participant activates the event stamp function, the time and/or location of the participant is identified and other information about the location can be searched. The device also collects GPS or other location information that is included in the event stamp to facilitate identifying the location. Alternatively, the participant may enter the location and/or time information into a website or on a page associated with the tracking system manually. Location information to be entered can include any information, including, an address, GPS locations, cross-streets, a residence, a store, a restaurant, a building, public transportation information (including the taxi, train route, bus route, boat, airplane flight number, the location, the identity of the public transportation), a taxi, etc. In an embodiment, the time, location, and/or other data could be recorded by hand for use in determining a location of the participant and/or the estimated time of arrival. Alternatively, the participant may carry a device that has an event stamp function on the device. If the device has GPS capability, the GPS coordinates may be automatically recorded as part of the event stamp. The event stamp function may be automatically activated periodically recording locations during a specific time or series of times. The event stamp and embodiments of the use are provided in U.S. patent application Ser. No. 15/265,806, entitled "MASH GUIDE/PROXIMITY GRID," filed on Sep. 14, 2016, which are herein incorporated by reference in its entirety.

Returning to the discussion of tracker system 110, the processor system of the tracker system 110 may be configured to automatically or manually request tracking information from a server for determining a time and location associated with event stamp information collected by (and optionally stored on), a smartphone and then sent to the server in response to pressing an event stamp button. Optionally, tracker system 110 may also process GPS signals, and have an even stamp. Optionally, tracker system 110 may also implement machine instructions for initiating the tracking by tracker system 110, initiating an event stamp function, and retrieving information from pages associated with a mash guide. An event stamp function is similar to a function that produces a timestamp but may include other information in addition to and/or instead of the time. For example, the event stamp may record time, location, and/or image information (e.g. photographs, audio and/or video of a location). Any of the functions discussed in association with any of the event stamp buttons or event stamp functions in this specification may be associated with any event stamp function that may be initiated by any event stamp button. A mash guide is an arrangement of people, objects, and places that is organized according to category and according to proximity to a user in search of information. for example, the items in the mash guide may be arranged in rows and columns, where each column is a different category, and items in higher rows are closer to the user and elements in further rows are further from the user (in other embodiments the rows and columns may be switched or other arrangements may be used).

Tracker system 110 may communicate with server system in order to provide the sever system with information about setting up the tracking, which may include specifying the participants in the tracking relationship. Tracker system 110 may provide unrequired options for the user performing the tracking to specify the period of times, range of dates, range of locations, for example, of when the tracking can occur, should the tracker want to take the time to provide such information (however, there is no need for providing this information if the tracker does not want to provided it). Alternatively, tracker system 110 may communicate directly with tracked system without the need for server system while setting up the tracking. Tracker system 110 may store a list of participants of tracking relationships, and the optional rules surrounding each participant to be tracked (if any such rules were specified). Although only one tracker system 110 is illustrated in FIG. 1, there may be any number of tracker systems, which may be tracking the same or different tracked systems.

Server system 150 may communicate with tracker system 110 and tracked system 170 to allow the tracking system to function with or without the event stamp function. The server system 150 may contain software for handling requests for tracking information, receiving information related to a user's whereabouts, and software for setting up and maintaining a tracking relationship. Tracking information is any information that is provided by the machine being tracked to server system 150 that relates to the whereabouts and/or activities of the user being tracked. For example, tracking information may include event stamp information, location coordinates (e.g., GPS coordinates), a location identifier, the time and/or date that that tracked machine was a particular location, a street address of a location, a city, a town, a postal code, a district, a state, a province, a territory, a country and/or continent, where the tracked machine is located, the type of establishment that the tracked machine is located in, and/or the owner/renter of a residence, room, office, building, and/or other location where the tracked machine is located. The tracking information may include contact information (e.g., a phone number or email address) for contacting the user of the tracked machine asking for more tracking information and/or an indication that the user of the tracked information is currently open to being pinged for further contact information. The tracking information may include text, sound, and/or images of the person being tracked and/or that are related to the location where the machine being tracked is currently located. The server may also include software for requesting a location of a user being tracked. A tracking relationship is an association between two or more users in which at least one of the users is the one being tracked and at least one of the users is the one performing the tracking. The tracking relationship is a relationship established by one or more machine instructions stored in the server system 150 associating those being tracked with those that are tracking, based on user input (where the user input determines who is tracked and to whom the tracking information is made available). The tracking relationship may result in, or be confined to, any number of tracking events (even just one tracking event) and any span of time. The tracking relationship may also include machine instructions that determine when, how (e.g., whether upon request or whether automatically sent without any request, whether tracking information is automatically provided by the tracked machine or whether the tracked machine is only open to being pinged for tracking information when being tracked), the frequency at which the tracking information is provided, and/or the format of the tracking information provided, optionally based on user input. The server can act as a filter between the tracker and the participant that identifies whether someone can be tracked by a certain tracker or tracker(s). The server may include all of the information or rules chosen by the tracker and agreed to by the one or more participants for the amount, method, and times for tracking. Server system 150 may include tracking information, a list of participants that the tracker would like tracked, and the rules surrounding each participant to be tracked.

The server 150 may also maintain a proximity grid in which stationary and moving objects may be located according to the user's proximity to the objects, and when performing a search of the objects, search results are returned ranked according to proximity to the user and relevance. Each entity that can be located that is in the proximity grid may have a virtual card, which is the page presented to the user representing that entity. The virtual cards representing the entities found may be arranged in a guide that is returned to the user performing the search. Some cards may represent mobile entities (e.g. food trucks), and the location of the mobile entities may be updated when the mobile entity moves. Some cards may be visible (e.g., accessible in a search) only during certain times. For example, if a food truck is only in a certain location during certain times, the card for the food truck may only be returned to a user performing a search during those times. In an embodiment, the times when the card is accessible are the times when the entity represented by the card is said to be "on the proximity grid."

The tracking function may be an extension of the proximity grid. The person being tracked may have a card on the proximity grid (similar to other mobile entities). However, the card of the person being tracked may only be accessible to the tracker and optionally to the person being tracked. The card of the person being tracked may only display the tracking information, such as where the person being tracked is currently located, and may only be accessible to the tracker, when the person being tracked is on the proximity grid.

Tracked system 170 may be a computer, a smartphone, a smartwatch, a laptop, or a tablet or any type of electronic device that has the capabilities to perform the functions of a method of tracking for a participant or trackee. The processor system of the electronic device of tracked system 170 may be configured to automatically or manually locate server system 170 and send location information to a server for determining a time and location associated with an event stamp information stored on a smartphone in response to pressing an event stamp button. In this specification, location information may include any information associated with the location of the person being tracked (the trackee) including any one or combination of an address, GPS location, map, name or owner of residence, telephone number of location, position coordinates, latitude, longitude, altitude, name of an establishment, a room number, for example at a particular point in time where the trackee's device (and therefore the person carrying the device) is located. Optionally, the tracking information may include a time at which the information was collected. In this specification, any place the word "time" is mentioned, such as in conjunction with an event stamp, it is generic to the time of day, the calendar date, and the combination of the time of day and the calendar date. Consequently, any place the word "time" appears at least three specific embodiments may be obtained by substituting, the time of day, the calendar date, and the combination of the time of day and the calendar date for the word "time."

The processor system of tracked system 170 may also process GPS signals or other location identifying signals to determine a location of the tracked system (which may belong to a participant or trackee). The processor system of tracked system 170 may implement machine instructions for initiating the tracking, event stamp function and retrieving information from pages associated with the mash guide.

Tracked system 170 may store an application, program, module for interacting with server 150. The application may include pages for, or the program may include instructions for, requesting server 150 to set up or agreeing to participate in a tracking relationship with another user and/or for notifying the server system 150 when the tracked system 170 would like to be on the proximity grid. Tracked system 170 may include instructions for requesting changes to what type of information is made available by server system 150 to the tracker system 110. Tracked system 170 may communicate with server system 150 and server system 150 may then communicate with tracker system 210. Alternatively, tracked system 170 may communicate directly with tracker system 110. Tracked system 170 may include an application for filtering out unwanted tracks. For example, the tracking information may only be available after providing authentication information (e.g., password, user identifier, and/or digital certificate), and the information may only be available after the authentication information is authenticated. Tracked system 170 may include software for generating event stamps, a list of trackers that are tracking the participant, and the rules surrounding each tracking relationship. The tracked system 170 may also include information about when the participant wants to be tracked and/or how the participant wants to be tracked, for example.

In an embodiment, a participant may choose to be pinged, and tracked system 170 may include software for responding to pings. For example, when pinged, the participant may activate the event stamp button to allow the participant's current location to be known at that time. When the participant accepts a ping, the tracked system 170 may automatically send an event stamp (or send tracking information in another form.

In an embodiment, the tracked system 170 may include a camera and send a picture as part of the tracking information. For example, an event stamp may automatically take a picture of the surroundings, such as the surrounding buildings and/or street signs, and send the picture with the other tracking information.

Figure 2A:
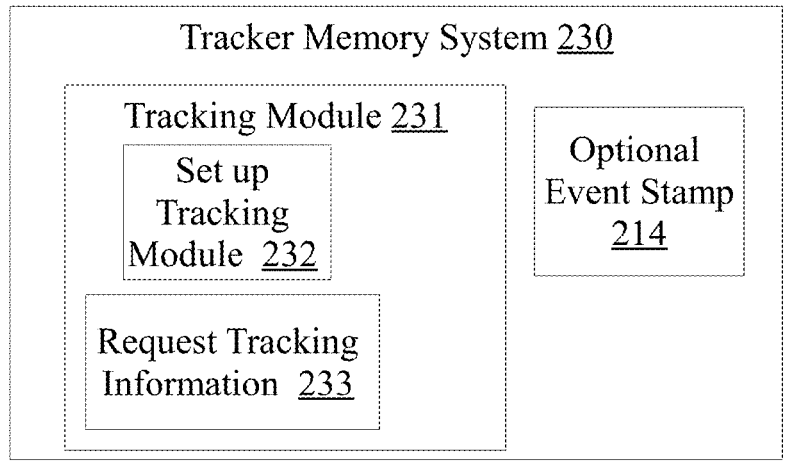
FIG. 2A shows a block diagram of an example of the memory of the tracking system.
Figure 2B:
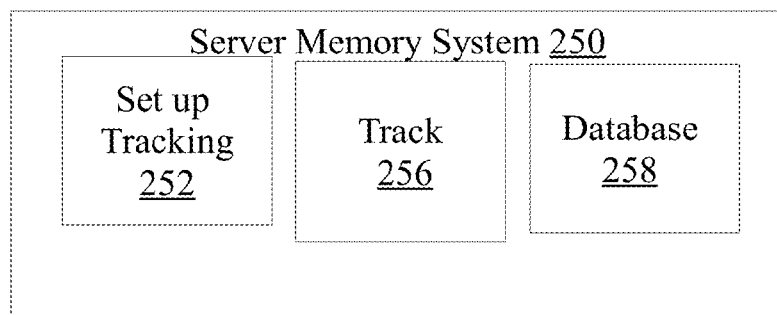
FIG. 2B shows a block diagram of an example of the memory of the server system.
Figure 2C:
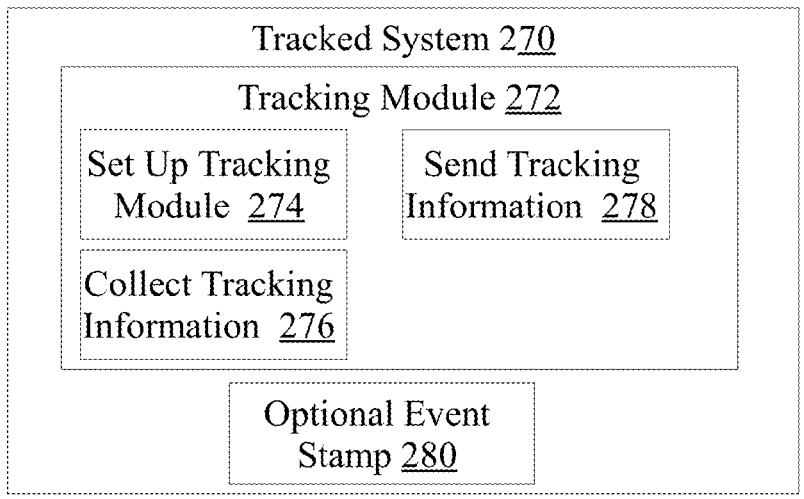
FIG. 2C shows a block diagram of an example of the memory of the tracked system.

FIGS. 2A-2C shows block diagrams of the modules used in tracking system 100. The modules may be software running at the server or on a tracker or participant's device (or both).

FIG. 2A shows a block diagram of an example of the memory of the tracking system. Tracker memory system 210 may include set up tracking module 211, set up event stamp 212, request tracking information 213, and optional event stamp 214. In other embodiments, tracker memory system 210 may include may not include all of the components and/or may include other components, in addition to, and/or instead of the components listed above.

Tracker memory system 210 is the memory system of tracker system 110. Tracking module 211 includes one or more machine instructions for communicating with the server regarding people being tracked. Tracking module 211 may periodically send a request to the server for tracking information related to those being tracked by the tracker. Tracking module 211 may include an event stamp function or event stamp button. Tracking module 211 may include one or more machine instructions for receiving a processing messages from the server regarding those being tracked by the tracker. Tracking module 211 may cause the tracking information to be immediately displayed upon receipt, may activate an alert when new information about someone being tracked is available, or may display the information received upon request by the user, depending on the options selected by the tracker. Tracking module 211 may place the tracking information into a particular format (e.g., according to the tracker's selections or according to a default format). Tracking module 211 may send an event stamp created on the tracker's device to the server, which may be used for determining a proximity of the person being tracked with respect to the tracker. Optionally, tracking module 211 may activate an alert (e.g., an alarm) if one of the people being tracked leaves a certain proximity or enters certain locations or certain types of locations (for example a parent tracking a child may want an alarm to be activated if the child enters a bar or part of a city that is perceived to be dangerous). Optionally, tracking module 211 may include software for a tracking module that can convert the GPS information originating from the participant's (trackee's) electronic device (e.g., via the server) and provide the information to the tracker in other terms, such as a street address. The information provided to the tracker may also include the name of a store, restaurant, or other location where the participant is located, telephone number of an establishment, email address, hours of operation of the establishment where the one being tracked is currently located, and/or a website of the establishment where the one being tracked is currently located, for example.

Set up tracking module 212 may include one or more modules for setting up the tracker to track one or more people. The tracker may want to set up more than one tracking relationship and/or type of tracking relationship. For example, the tracker may want continuous tracking of family members, but may want to track employees only during specific time periods, such as while the company is open, during the shift of that employee, or during times when a deadline is near. For example, setup tracker 212 may include a user interface, which when activated presents one or more fields to the tracker for entering an e-mail address or phone number and/or other identifying information of a person the tracker would like to track. The set up tracker may also include a submit button. The user may only need to enter identifying information of the person to be tracked and an invitation may be sent to the person being tracked requesting permission to track the person to be tracked. Set up tracking 212 may include optional fields that the tracker has the option to fill-in that specify specifics of when and how the tracker would like to track the one being tracked. For example, there may be one or more fields for filling in the times of day and/or a range of dates during which the tracking is desired or is not desired. Set up tracking may also have optional fields for specifying the type of information provided as part of the tracking, such location coordinates, name of establishment, city, street address, and/or zip code. Set up tracking 212 may include options for selecting whether the tracking information is automatically displayed upon receipt, whether an alert is automatically displayed upon receipt of the tracking information, or whether the tracking information is only displayed upon request. The set up module allows for specifying that the tracking should occur at only one or a finite number of events, for specifying that the tracking should occur for only one or a finite number of types of events.

Request tracking information 213 is a module of tracking module 211 that requests the tracking information. Request tracking information 213 may provide an interface for manually requesting the tracking information of those being tracked from the server 150. Request tracking information 213 may provide an interface for pinging a user that is being tracked, but only wants to be pinged. Request tracking information 213 may provide an interface, via which to set up an automatic, periodic sending of requests to the server for tracking information of those being tracked.

Optional event stamp 214 may create an event stamp which may be used by the tracker to send the server, where the event stamp information includes the tracker's current location, and in response the server may send a list of the people being tracked arranged according to proximity to the tracker. Optionally, the list of people being tracked may be provided as one category on a mash guide.

FIG. 2B shows a block diagram of an example of the memory of the server system 150. Server memory system 250 may include a set up tracking module 252, a tracking module 256, and a database 258. In other embodiments, server memory system 250 may not include all of the components and/or may include other components, in addition to, and/or instead of the components listed above.

Server memory system 250 is memory of server system 150. Set up tracking module 252 may include a set up module that is sent to one or more trackers and one or more users that want to be tracked. Set up tracking module 252 may include one or more webpages, or information for triggering the display of, and for populating one or more pages of, an app (that runs a device of the creator), for a creator of the tracking relationship to set up/create a tracking event. The webpages or the pages of the app may allow the creator of the tracking relationship or other participants to view the location(s) of one or more participants, and may include an event stamp module (the creator of the tracking relationship may be the tracker, the one being tracked and/or the one on whose behalf the tracking is being performed or someone else overseeing the tracking relationship). The tracker(s) may provide specific information about tracking for one or more tracking relationships. The creator of the relationship may provide specific information for the tracking relationships may include times, dates, hours, whether the participant can opt-in or opt-out, whether the participant can choose to be pinged instead, tracking information and/or information about the user being tracked.

Tracking module 256 receives tracking information from the machine being tracked. The tracking information (e.g., timestamp information) may be automatically and/or periodically sent to the server 250 or may be sent to server 250 in response to a request from tracking module 256 for the tracking information. For example, tracking module may automatically periodically request tracking information at predetermined a times, and in response, receive the tracking information (e.g., a timestamp information) from tracking system 110. The tracking module 256 may also determine which users may access the tracking information obtained and optionally may forward the tracking information to the tracking system 110 (depending on the options chosen by the tracking system 110). Tracking module 256 may also determine further information about the whereabouts of the tracked system 170, such as a street address, based on the GPS or other location coordinate received and a database of location information. Tracking module 256 may record the location of the tracked system 170 in association with a time at which the tracked system was in that location.

Database 258 store tracking information. The tracking information may include past and present locations of the person being tracked and/or the times when the person being tracked was at those locations. Database 258 may store may the time, date, locations and data about the locations where a person or person(s) being tracked was located. Database 258 may also include information specifying which trackers are authorized to obtain information about which trackees. Database 258 may also store user chosen settings, such as the type of information that is included in the tracked information stored, and how and when the tracked system is to be tracked (e.g., whether the tracked system is only available to be pinged at a particular time and whether the only tracking information provided is whether the tracked machine is currently open to being pinged) or whether the tracked system provides tracking information while being tracked. Database 258 may also store data for creating a mash guide and/or other location information relating GPS coordinates to street addresses and/or other location information.

A security system (e.g., having modules stored in the server memory system 250) may be included in server system 150. The security system may determine whether a request for tracking information should be granted, based on whether or not the tracker has a tracking relationships with the one being tracked. For example, any particular tracker can only track participants that have accepted or allowed tracking from that tracker. Participants may only be tracked by the trackers that the participant has accepted.

FIG. 2C shows a block diagram of an example of the memory of the tracked system. Tracked memory system 270 may include a tracking module 272, set up tracking 274, collect tracking information 276, send tracking information 278, and an optional event stamp 280. In other embodiments, tracked memory system 270 may not include all of the components and/or may include other components, in addition to, and/or instead of the components listed above.

Tracking module 272 may include a module that allows a user to be tracked for example, using the GPS in the user's telephone or another electronic device. Tracking module 272 may automatically and periodically send tracking information to server 150, while tracking system 170 is being tracked. Alternatively, tracking module 272 may detect changes in the tracking information (e.g., changes in location), and automatically send the updates of tracking information to server 150, while tracking system 170 is being tracked.

Set up tracking 274 provides an interface for accepting an invitation to be tracked or inviting a tracker to track the machine being tracked. Set up tracking 274 provides an interface via which the user may enter information about the people that are authorized to track the user, optional choices about how the user wants to be tracked and/or what information the user wants to provide to the tracker. In an embodiment, when initiating the tracking relationship, the user just needs to enter an identifier of the user that may track the machine being tracked and nothing more (the server will then send the invitation to join the tracking relationship to the rest of the participants). In an embodiment, when receiving an invitation to join a tracking relationship (that was initiated by someone else), the user just needs to enter an identifier of the user that may track the machine tracked and nothing more (the server will then send the invitation to join the tracking relationship to the rest of the participants). Then, by default the machine being tracked can be tracked whenever the user is on the gird (e.g., when the machine being tracked sends event stamps or sends a message requesting to be on the proximity grid, and allows the server and/or other users of the tracking system to contact the user).

Collect tracking information 276 collects tracking information from the machine being tracked (which may include the user's location information and the time that the information was at that location). Send tracking information 278 sends the tracking information collected by collect tracking information 276. Collect tracking information 276 and send tracking information 278 may be different modules of an event stamp, which when activated cause the information collected by the event stamp to be sent the server 150. The tracking information sent by send tracking information 278 may include location information and the time that the machine being tracked was at that location. Send tracking information 278 may send the tracking information periodically and automatically, until the user of the machine being tracked decides to disconnect from the grid.

Optional event stamp 280 may create an event stamp which may be used by the tracker to send the server, including the tracker's current location, and in response the server may send a list of the people being tracked arranged according to proximity to the tracker. Collect tracking information 276 may activate the event stamp function to collect the event stamp information and send tracking information 278 may cause the event stamp function to send the tracking information.

Alternatively, the applicant can be tracked whenever the applicant activates the event stamp button provided on the electronic machine and/or the event stamp 280. Optional event stamp 280 may include an event stamp button, and an event stamp function that records multiple pieces of information, such as the time of day, the date, and the location. In an embodiment, the location is identified by collect tracking information 276 or event stamp 280, via GPS coordinates.

Figure 3:
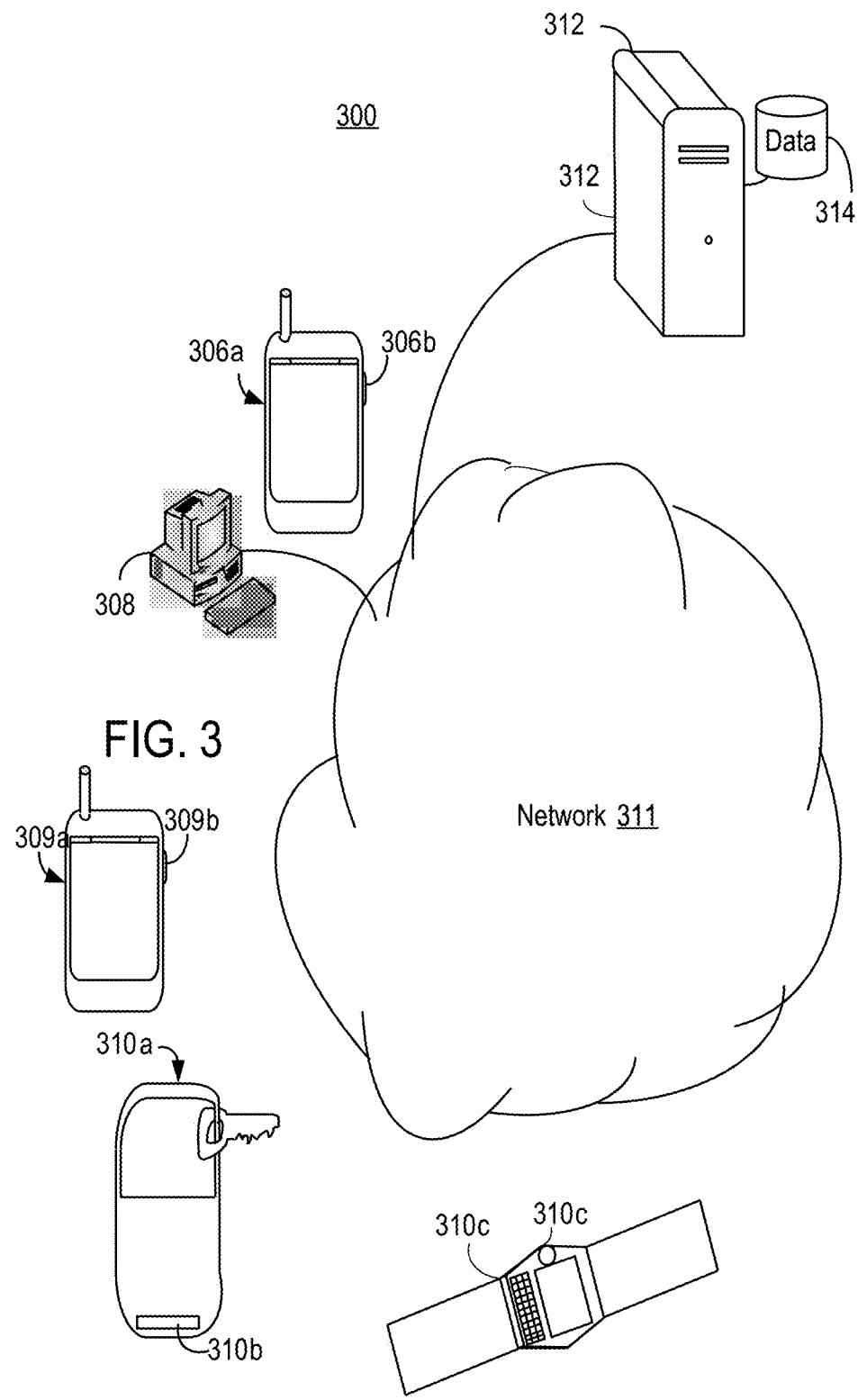
FIG. 3 shows a representation of an example of a system for tracking.

FIG. 3 shows a tracking system 300. Tracking system 300 includes mobile phone 306a optionally having event stamp button 306b, keychain 310a having event stamp button 310b, network appliance 308, mobile phone 309a optionally having event stamp button 309b, network 311, host 312, and database 314. In other embodiments, tracking system 300 may not have all of the components associated with FIG. 3 or may have other components in addition to or instead of those components associated with FIG. 3.

Tracking system 300 may be used for tracking one or more different persons (e.g., participants). Tracking system 300 identifies the location of one or more persons at a specific point in time.

Mobile phone 306a is an example of device that may have an event stamp function, and is an example of a network appliance that can be used for tracking. Mobile phone 306a may link via a phone network to a computer network to retrieve information associated with a location. Mobile phone 306a may be an embodiment of the tracker system 110 (FIG. 1). A user may use mobile phone 306a to retrieve and/or received information about a user being tracked. Mobile phone 306 may also be used to set up a tracking relationship.

Mobile phone 306a may include an event stamp button 306b. Although event stamp button 309b is depicted as a button, event stamp button 306b may be a menu item that is selected using cursor control buttons, such as the cursor control buttons that are often associated with the keypad of a mobile phone. Event stamp button 306b is a button that activates an event stamp function, which is a function that causes the recording of tracking information. The event stamp information collected by event stamp button 306a may cause a search for users being tracked according to proximity to the user having mobile 306a.

An event stamp function may be placed on any mobile device to get information while traveling. The event stamp function may be placed on a viewing device, such as a smart phone, a television, or on the dashboard of a car. The event stamp function may be placed elsewhere in a car, in a purse, in a wallet, on a briefcase, on a bicycle, and/or on a keychain (some examples are discussed below). Similarly, event stamp button 306b may be included on a mobile device, a mobile phone (e.g., a smart phone), a media player, a computer, a web appliance, a MP3 player, a radio, a television, a vehicle, a laptop, a tablet, a handheld computer, a keychain or a memorandum device, for example. Each time a participant activates the event stamp function, the time and/or location of the participant is identified and other information about the location can be searched. The device also collects GPS or other location information that is included in the event stamp to facilitate identifying the location.

Network appliance 308 may be any of a number of types of appliances that are capable of accessing a network, such as a computer, a terminal, a web television, and/or a mobile phone. Network appliance 308 may be used for tracking another user and/or for setting up a tracking relationship.

Mobile phone 309a is an example of a device that may be tracked by the system 300. Mobile device 309a may have an event stamp function. Mobile phone 309a may link, via a phone network, to a computer network to send information associated with a location. Mobile phone 309a may be an embodiment of the tracked system 170 (FIG. 1). Mobile phone 309a may include an event stamp button 309b. Although event stamp button 309b is depicted as a button, event stamp button 309b may be a menu item that is selected using cursor control buttons, such as the cursor control buttons that are often associated with the keypad of a mobile phone.

The event stamp function may be activated by one or two actions, for example the activation of an event stamp button (a physical button or a virtual button) and an agreed upon time for automatic activation of the event stamp button (e.g., every 20 minutes). The event stamp information may include time and location information. Event stamp button 309b may be a physical or virtual button. Event stamp button is an example of an implementation of an event stamp function that may be included in any tracking device.

Event stamp button 309b may be a dedicated mechanical button, a heat sensitive pad, or other touch sensitive pad that is dedicated to activating the event stamp function. Although in one embodiment, the tracking function may be activated by pressing on a physical button in other embodiments the tracking function is activated in any of a variety of other ways. For example, instead of event stamp button 309b, the event stamp function may be activated by virtual button, another type of a switch, an icon on a display, a roller, or may be a function of another button (the button is multifunctional). Optionally, the event stamp function may be accessible via a webserver (e.g., via a website) associated with the tracking system.

In one embodiment, event stamp button 309b is a timestamp that records the time of the tracking, the location of the trackee and/or the name of the trackee. In an embodiment, event stamp button 309b may record a location associated with the pressing of event stamp button.

The event stamp function may be associated with a multiplicity of different functions for tracking. Optionally, if the person being tracked is off the grid, but still wants the tracker to know where the trackee went while off the grid, the event stamp function may be used for creating a journal of locations (and times) that the trackee visited. The event stamp function may cause a search for anything associated with the location of the trackee, including, an establishment (store, office, building), an address, a telephone number, a person or an email. As another example, a user (tracker or trackee) may manually enter a time and a location within a mode of public transportation (a train, airplane, bus, taxi, etc.) In response to this, for example, the tracker or the server may be able to determine the origin, regular schedule, and/or estimated time of arrival of the mode of public transportation.

Keychain 310a is another example of a tracked device that could have an event stamp button, and keychain 310a may be for car keys and/or other keys. Keychain 310a may sending the tracking information, via another system, such as a mobile phone 309a or a car, to server 150. Event stamp button 310b is similar to event stamp button 309b in that it may be used for recording location identifying information.

Watch 310c is another example of a location where an event stamp function may be placed. Watch 310c may include software and/or circuitry capable of identifying the location and time the event stamp is activated and a transmitter for sending the event information to a Wi-Fi and/or Bluetooth enabled device or another network appliance. Watch 310c is another example of a tracked device that could have an event stamp button, and watch 310c may indicate the time and communicate with a mobile phone. Watch 310c may send the tracking information, via another system, such as a mobile phone 309a or a car, to server 150. Event stamp button 310d is similar to event stamp button 309b in that it may be used for recording location identifying information.

Network 311 may be any one of, or any combination of one or more Local Area Networks (LANs), Wide Area Networks (WANs) (e.g., an Internet or intranet), phone networks, wireless networks, and/or other networks. Tracking and/or location information is sent from one of the devices having a tracking function via network 311 to a database, where more information about the tracking and/or location may be obtained.

Host 312 may host a website that may be accessed by one of the network appliances. Host 312 is an example of server 150. The tracking information (which may include location identifying information) is sent from one of the network appliances, via network 311, to host 312 (e.g., as event stamp information). Host 312 may optionally use the event stamp information (and/or other information) to retrieve other information related to the location, which may include the street address, one or more cross-streets, a GPS location, the name of an establishment, map, phone number, email address, website, name of the owner of the building, transportation information (train, bus, car, boat, plane, taxi) schedule, route, other identification, etc.

In one embodiment, host 312 may host a website in which a user enters his/her time and location and the website returns information associated with the location. The website may have links to one or more businesses at the location. The website may host a site for setting up a tracking relationship, one or more participants may see where other participants are, and/or the one setting up the tracking relationship and one or more participants of the tracking relationship may communicate.

Database 314 may store information that is used by host 312 in conjunction with the tracking information sent from one of the web appliances or other tracking devices to identify the location at a point in time of a participant. For example, database 314 may store information, such as links to websites associated with the location. Host 312 may maintain database 314. Database 314 may maintain a correlation of location information, such as location coordinates, with times when those being tracked were at those locations and/or with street addresses, landmarks, names of buildings, names of owners of building, names of occupant of locations, stores, and/or retail establishments associated with those locations. Database 314 may maintain a correlation of routes, schedules, and bus numbers, plane identifiers, and/or train identifiers, so as to identify whether the person being tracked is on a particular route, bus, train, or plain. Database 314 may maintain a correlation of taxi identifiers and current locations of the taxis (e.g., by having a stream of event stamps sent from the taxi), so as to identify whether the person being tracked is in a taxi. Database 314 may maintain a correlation of restaurants, locations, telephone numbers, and owners. The locations of the stores, homes, restaurants, etc. may include the current GPS coordinates (or other locations identifiers), which may be used in identifying the location of the person being tracked.

Figure 4A:
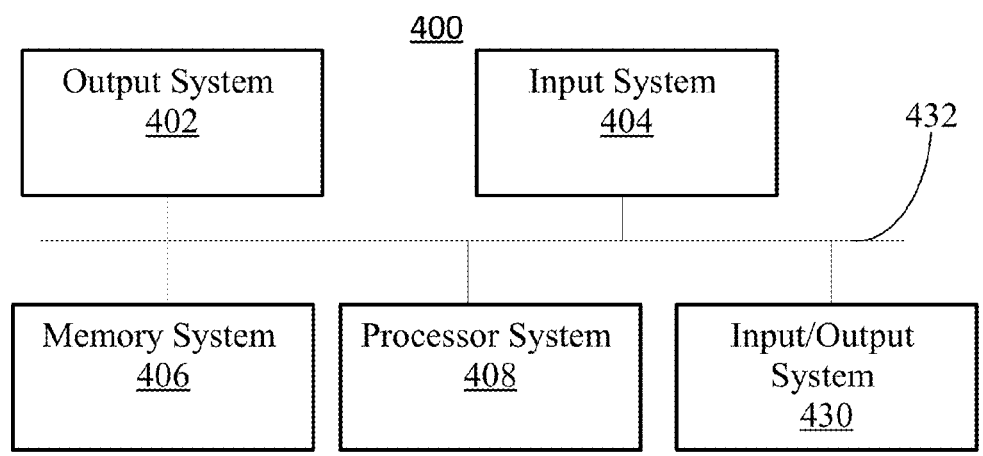
FIG. 4A shows a block diagram of an example of a machine that may be used in the tracking system of FIG. 3.
Figure 4B:
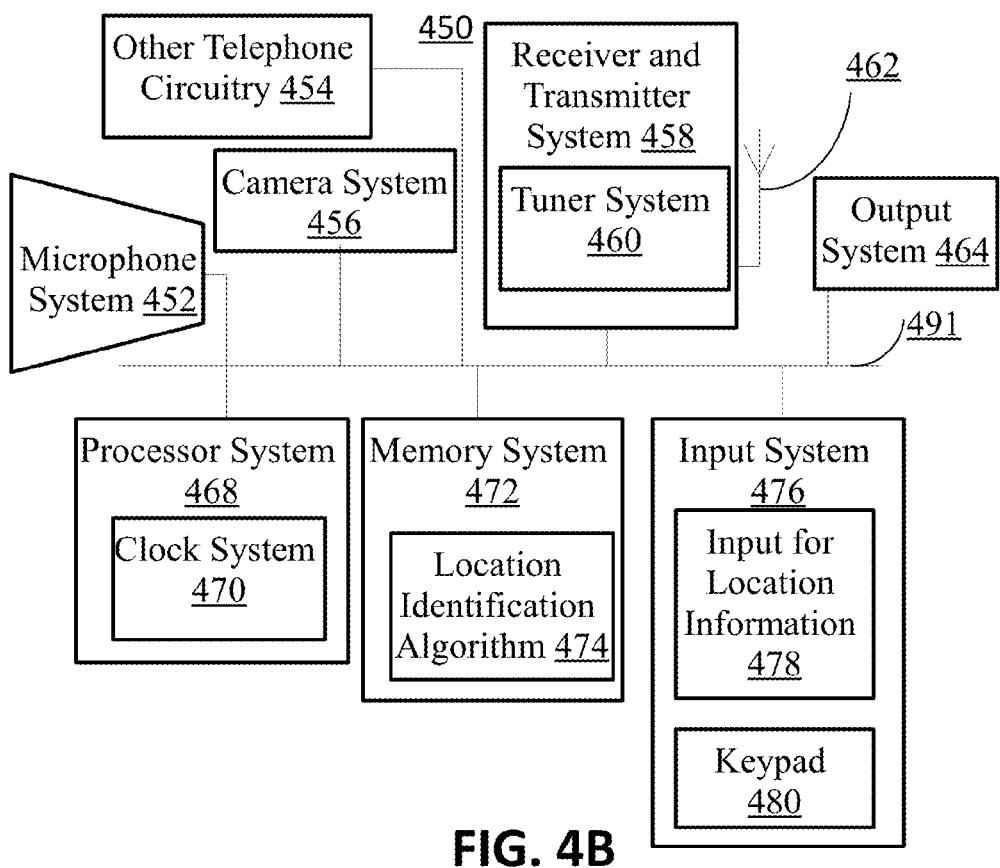
FIG. 4B shows a block diagram of an example of a mobile phone that may be used in the tracking system of FIG. 3.

FIGS. 4A and 4B show embodiments, of a machine 400 used in tracking system 300. The machine 400 can be used by a tracker or a trackee. FIG. 4A shows an embodiment of a computer-type machine. FIG. 4A shows a block diagram of a machine 400 used in tracking system 300. Machine 400 is a generic computer, laptop, tablet or another device. Machine 400 may include output system 402, input system 404, memory system 406, instructions 407, processor system 408, communications system 412, and input/output system 414. In other embodiments, machine 400 may not include all of the components and/or may include other components, in addition to, and/or instead of the components listed above.

Machine 400 is an example of a computer or other machine that may be used for any of network appliance 308, host 312, and database 314. Output system 402 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or Internet, for example.

Input system 404 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or the Internet (e.g., IrDA, USB), for example.

Memory system 406 may include, for example, any one of, some of, any combination of, or all of a long term storage system, such as a hard drive; a short term storage system, such as random access memory; a removable storage system, such as a floppy drive or a removable drive; and/or flash memory. Memory system 406 may include one or more machine-readable mediums that may store a variety of different types of information. The term machine-readable medium is used to refer to any non-transient medium capable carrying information that is readable by a machine. One example of a machine-readable medium is a computer-readable medium. Another example of a machine-readable medium is paper having holes that are detected that trigger different mechanical, electrical, and/or logic responses. Memory system 406 may be an embodiment of memory 250 (FIG. 2B).

Instructions 407 allow machine 400 to perform the tasks for which machine 400 was intended (the tracking system). If system 400 is used for network appliance 308, instruction 405 may include a tracking module and a tracking module may be included for keychain 317a and/or mobile phone 319a. If machine 400 is host 312, instructions 407 may cause one or more processors to present a webpage, or send information for consumption by a page of an application, for setting a tracking relationship or for accessing tracking information. If machine 400 is host 312, instructions 407 provide a module or instructions to machine 400 to receive and process location information from a network appliance, and to find information about the location and to send location information to host 312. Instructions 407 may cause host 312 to submit a query to database 314 and retrieve information from database 314 for tracking information.

Processor system 408 may include any one of, some of, any combination of, or all of multiple parallel processors, a single processor, a system of processors having one or more central processors and/or one or more specialized processors dedicated to specific tasks. Processor 408 may implement instructions of tracking 407 to facilitate tracking of one user by another user. Processor 408 may implement instructions for an event stamp function to be performed in response to pressing an event stamp button or otherwise activating an event stamp function as part of tracking an individual.

Communications system 412 communicatively links output system 402, input system 404, memory system 406, processor system 408, and/or input/output system 414 to each other. Communications system 412 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 414 may include devices that have the dual function as input and output devices. For example, input/output system 414 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 414 is optional, and may be used in addition to or in place of output system 402 and/or input system 404. If machine 400 is network appliance 308, input/output system 414 may include an event stamp button or other mechanism for activating a tracking function.

FIG. 4B shows a block diagram of an embodiment of mobile phone 450 (see 306a or 310a in FIG. 3). Mobile phone 450 may include microphone system 452, other telephone circuitry 454, camera system 456, and receiver and transmitter system 458. Mobile phone 450 may also include antenna system 462, output system 464, bus system 466, speaker system 467, and processor system 468, which may include clock system 470. Mobile phone 450 may also include memory system 472, which may store tracking module 474. Also, mobile phone 450 may include input system 476, which may include input for identification information 478 and keypad 480. In other embodiments, mobile phone 450 may not include all of the components and/or may include other components, in addition to, and/or instead of the components listed above.

Mobile phone 450 may be an embodiment of tracker system 110 or of tracked system 170, mobile phone 309a or 310a. Microphone system 452 is for the user to speak into when making a telephone call. Other telephone circuitry 454 is the circuitry that allows mobile phone 450 to function as a telephone, which may include functions for dialing, connecting to a telephone network, storing messages, storing phone numbers, and voice mail, for example.

Camera system 456 is for taking pictures and is optional. The user may choose to take a picture of a location, upload the picture and send the picture to the server and/or to the tracker, for example. Camera system 456 may also take a picture in response to activating the event stamp button (see 309a in FIG. 3) or collecting tracking information in another manner. The picture taken by camera system 456 may be stored in association with the time and other location information.

Receiver and transmitter system 458 receives and transmits messages from and to, respectively, a wireless network. Receiver and transmitter system 458 may receive and transmit phone messages. Optionally, receiver and transmitter system 458 may also receive radio waves. Receiver and transmitter system 458 may also be capable of receiving GPS signals for determining a current location. Receiver and transmitter system 458 may be used for communicatively coupling to a web server, such as website host (see 312 in FIG. 3), that stores information, such as contact information for restaurants, movie theatres, stores, train schedules, airplane schedule, contact information for taxis, or other contact information based on locations. Receiver and transmitter system 458 may include a radio frequency receiver and transmitter and/or a Wi-Fi, infrared, and/or other near field communications receivers and transmitters.

Output system 464 includes a display screen, which may be used for outputting information about location information (which may have been produced as a result of activating an event stamp button), viewing information about locations, maps, etc. Output system 464 may be used for surfing a WAN, such as the Internet, sending and viewing text messages, and viewing web pages. For example, output system 464 may be used for viewing a website or page of an application associated with the tracking. Output system 464 may include a port that can be communicatively coupled to a computer or monitor, via which the information may be transferred to the computer or monitor so that the tracking information may be viewed and displayed on a larger screen to facilitate viewing the tracking information, via a website on network (see 311 in FIG. 3).

Bus system 466 carries signals between all of the components of mobile phone 450. For example, bus system 466 communicatively couples microphone system 452, other telephone circuitry 454, camera system 456, receiver and transmitter system 458, output system 464, and processor system 468 (processor system 468 is discussed in the next paragraph). A speaker system may be used for listening to phone calls, radio stations, television programs, audio files played by an application and/or audio files stored on a web pages, for example.

Processor system 468 implements the methods of tracking and the machine instructions stored in memory system. Processor system 468 may implement instructions for carrying out the operations associated with a mobile phone. Processor system 468 may contain one or more processors. Processor system 468 may be configured for automatically or manually determining a location associated with activation of an event stamp at a trackee's machine at a point in time. Processor system 468 may also process GPS signals to determine a location.

Clock system 470 may be used for determining a time associated with activation of an event stamp and/or a location. For example, if a user presses on an event stamp button, processor system 468 may read clock system 470 and record the time in association with a location.

Memory system 472 may store the tracking and location information. For example, memory system 472 may store a time associated with pressing an event stamp button and a location that processor system 468 determined as being associated with the location of the mobile phone. Memory system 472 may also store a picture of a location taken by camera system 466, which may be included in the tracking information that is sent to the server. Similarly, memory system 472 may store a location where the timestamp was pressed, which may have been determined by processor system 468 based on GPS signals.

Tracking module 474 may also be stored in memory system 472. Tracking module 474 may contain instructions that cause processor system 468 to automatically (and/or manually) set up and implement the tracking, identify one or more locations (of one or more trackee's machines), and provide information to the tracker about the locations. Memory 210 (FIG. 2A) or 270 (FIG. 2C) may be embodiments of memory system 472.

Input system 476 may include any of a variety of input mechanisms, such as keys, buttons, touch pads, ports for optically or electronically downloading information from other machines (e.g., computers or other mobile phones). In an embodiment, input for location identification information 478 may include one or more buttons that initiate a tracking function, which may include a collection of location information. For example, input for location information 478 may include a button (event stamp button) that may cause processor system 468 to read and record the time from clock system 470. Additionally, the button may cause a picture to be taken and stored in association with the time. Alternatively, the button may cause processor 468 to collect GPS or other location information, which is then stored in association with the time. The button may also cause processor 468 to access a database containing more information related to the location information stored. Additionally, or alternatively, input for location information 478 may include a button for causing location information collected to be displayed via output system 464.

Keypad 480 may be a standard keypad provided with a standard mobile phone. Keypad 480 may include on or more keys for the one being tracked to change states from being on the proximity grid to being off the grid and from being off the grid to being on the proximity grid and/or switching phone 400 from being trackable to being untrackable and from being untrackable to being trackable (so that the filling out of many forms to indicate when the user would like to be trackable and when the user would like not to be trackable is replaced by a single button). Optionally, one or more of the keys of keypad 480 may act as one or more event stamp buttons. Keypad 480 may include keys that allow the user to view location information that was recorded, or retrieve information from one or more databases related to the location and/or tracking.

In an embodiment, a keychain for use with the tracking system may have all of the elements of FIG. 4A except telephone circuitry 454, camera system 456, speaker system, and keypad 480.

In an embodiment, a smart watch used with the tracking system may have all of the elements of FIG. 4A except telephone circuitry 454, camera system 456, speaker system, and keypad 480.

Setup—Server Method

Figure 5A:
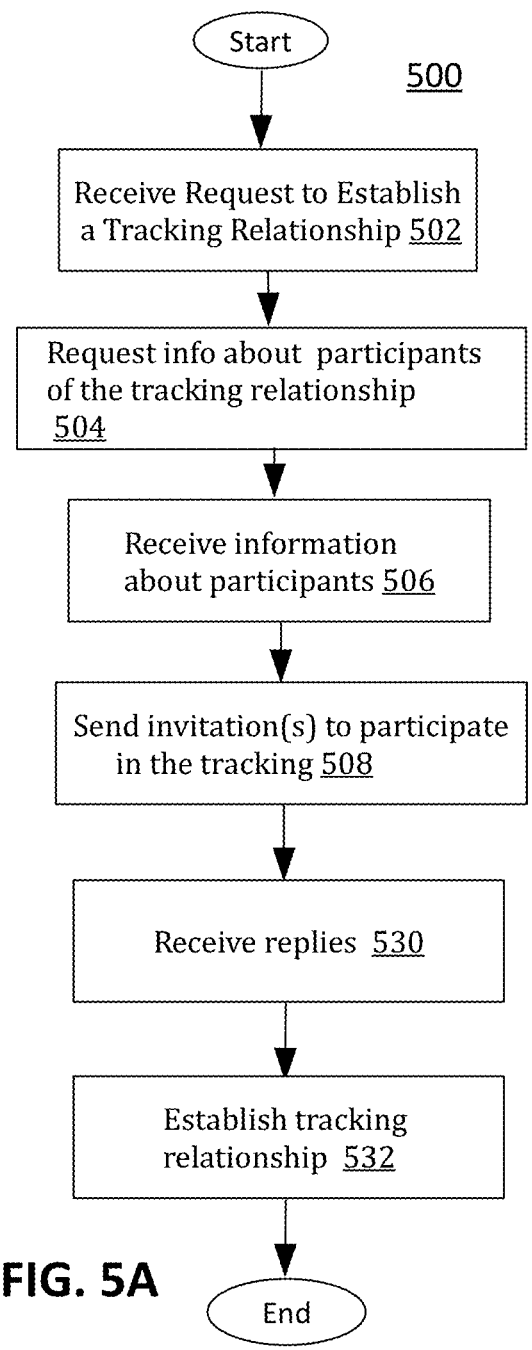
FIG. 5A shows a flowchart of an embodiment of a method of establishing a tracking relationship from the perspective of the system.

FIG. 5A shows a flowchart of an embodiment of method 500 in which for setting up a tracking relationship from the perspective of the server. In the embodiment in FIG. 5A, the information received at the server may be received from a smart watch, via a smart phone, and the results may be sent from the server to the phone to the watch.

In an embodiment, the server system 150 receives a request to create a tracking relationship 502. The request may come from a person creating a tracking relationship (a creator of the relationship), which may be the one being tracked or the tracker. The creator of the relationship can be any person who wants to track another person or be tracked.

For example, the creator of the relationship might be an employer who wishes to track one or more employees or may be one of the employees being tracked (e.g., in case an emergency comes up for which the employee is needed to solve a problem). Alternatively, the creator of the relationship might be a parent who wants to track one or more family members or may be one the family members being tracked, such as the parent's children, so as to know where to find the children in case the children forget to come home on time.

In an embodiment, in step 504, the server system 150 may send rendering information for a page of an application or send information that causes a page of an application to be displayed in a browser, where the page requests information about the one or more persons participating in the tracking (or alternatively information may be sent to cause a page of an application to be displayed, where the page of the application requests information about the one or more persons participating in the tracking). In an embodiment, the information requested may only include the name of the participants and e-mail addresses of the participants if the participant will be sending or receiving tracking information and/or the information may include authentication information, so that the participant can securely access, enter, and/or modify the tracking information on the server. Optionally, the information may include a name or other identifier of those that will be participating in the tracking relationship, optionally a relationship to the creator of the relationship and some contact information, such as telephone number(s), addresses, optionally work information (the participant's position in company or work identifier), and/or email address, for example. The request may be sent as a page to be filled out by the creator of the relationship, and the page may include fields to be filled out indicating the participants in the tracking relationship. Optionally, the page may also include whether the one being tracked is only going to be pinged for tracking information or whether tracking information will be supplied without pinging. The page may include optional fields in which in the creator of the relationship can specify when the tracking is to occur, where the tracking can occur, and/or the nature of the information provided.

In step 506, the server receives from the creator of the relationship information about the tracker and/or the person to be tracked (trackees). The server may have default settings for the tracking relationship that can be used if the creator, tracker, and trackee choose not specify rules or parameters for the tracking relationship. In one embodiment, if no rules or parameters are specified for the tracking relationship, then the person being tracked can be tracked when the person being tracked is locatable by the proximity grid (e.g. as indicated by the receipt of event stamps or the receipt of a message from the person being tracked that the tracking information is available or that the person being tracked is now locatable be the proximity grid and/or by the tracking service). Optionally, a tracking relationship maybe established and the information needed for a tracking relationship may be provided automatically when a participant begins a job at a company. For example, the company may require the participant to be trackable as part of the employment agreement or when joining an organization. For example, a company or organization may require the participant be trackable at specific times (e.g., during work hours or during a certain shift that may be outside of work hours).

Tracking may be implemented on any computer readable medium device, including a cellular phone, tablet computer, laptop, or desktop.

In optional step 508, the server sends invitations to the participants in the tracking relationship (other than the creator of the tracking relationship). If the creator of the tracking relationship is the tracker, the invitation is sent to at least on person being tracked, and if the creator of the tracking relationship is someone that will be tracked, the invitation is sent to the tracker. Optionally, the invitations may include a field for indicating whether the tracking information will only be available upon pinging the person being tracked. Optionally, options for specifying parameters (that are not necessary for establishing the tracking relationship) under which the tracking may take place may also be provided that the invitee may specify, should the invitee desire.

Optionally, in step 508, the server may send a page or send information causing a page to be displayed providing options for setting up rules for the tracking and/or setting an expiration of the tracking. Rules may include which days the user may and may not be tracked (e.g., holidays), which hours during the day a person may be tracked (e.g., from 9 to 5). The page may have a field for indicating whether the tracking is to be continuous (e.g., a parent tracking a son or daughter) or is only for a specific event (e.g., a meeting) or may be for a specific role (e.g., an employee). If the tracking relationship is temporary, there may be a field for specifying the expiration of the tracking relationship, which may be specified by specifying that the tracking relationship terminates at the termination of an employment, when the one being tracked changes the location of residence, one the one being tracked takes a vacation, or when a meeting ends.

The server may receive from the device of the creator of the relationship, information about the rules for tracking which can be used to configure a tracking relationship. Any information that is not specified by the creator, tracker, or trackee may revert to default settings, which is that the trackee is only trackable when the trackee is locatable via the proximity grid (or on the proximity grid) or locatable by the server.

In step 510, the server receives one or more replies to the invitations. The replies may include an indication was to whether the one being tracked will be pinged for tracking information or whether the tracking information will be available without the one being tracked receiving a ping, and further optional information from the invitees about parameters of the tracking relationship.

In step 512, the tracking relationship is established, and the tracker is allowed to view, at the server, and/or is sent, by the server, the tracking information supplied by the device of the person being tracked.

Regarding steps 506-510 and some options that may be provided for the participant's in the tracking relationship to specify, optionally, the server may send further pages requesting more information about tracking. For example, in step 506, the server requests information about the preferences for tracking. Preferences may include the type of tracking—whether continuous or temporary and whether tracking information is only provided in response to a ping. For example, a continuous tracking may be used for the tracking of a family member. A temporary tracking may be used for an employee or for a meeting or event. A temporary tracking may be a one-time occurrence or may be a recurring occurrence. A temporary tracking may have a short expiration date (e.g., the date and time of the end of the meeting or event). In the case of an employee, the expiration of the tracking may be when the employee/employer relationship ends. Preferences may include how the tracking occurs based on whether the participant is "on the proximity grid" or off. For example, in an embodiment, the participant may only be considered on the proximity grid, when the participant's device is generating event stamps to indicate the participant's current location. Alternatively, the participant may allow tracking only when the participant is signed into a website. Other preferences can include dates, days and times. For example, for an employee, the tracking may only occur during work hours, and on work days (minus vacation and sick days). The trackee may be involved in specifying which dates, days, and times the tracking can occur. The preferences may vary for each person being tracked. For example, if there is a group being tracked, each person in the group may have different preferences.

In an embodiment, although depicted as distinct steps in FIG. 5A, step 502-514 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

Setup—Creator Method

Figure 5B:
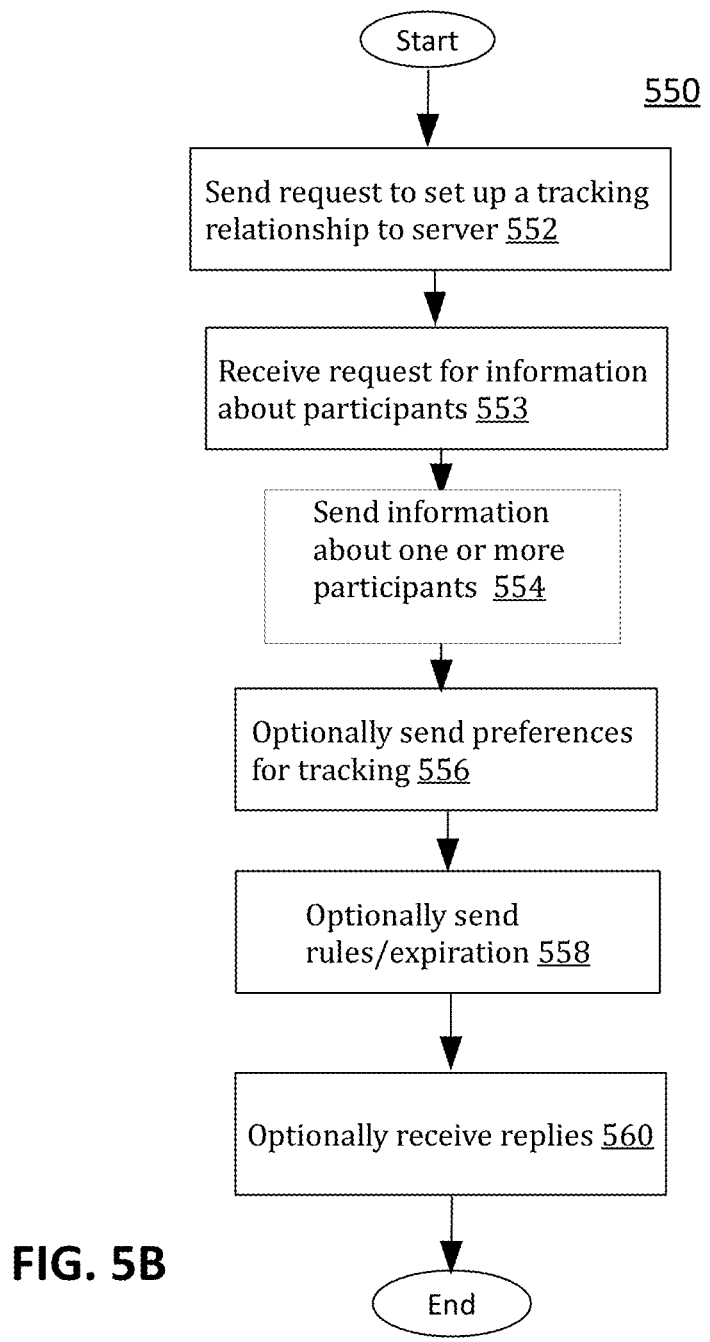
FIG. 5B shows a flowchart of an embodiment of a method of establishing a tracking relationship from the perspective of the machine of the creator of the tracking relationship.

FIG. 5B shows a flowchart of an embodiment of method 550 in setting up a tracking relationship from the perspective of the machine of the creator of the relationship.

In step 552, the machine of the creator of the relationship sends a request to establish a tracking relationship between one or more persons to a server system 150. The request can be sent by filling out a webpage in a browser or a page of an application. In an alternative embodiment, the request may be sent by sending an email, sending a text, making a telephone call, etc. In an embodiment, the creator of the relationship may be any person participating in the tracking relationship. For example, the creator might be an employer who wishes to track one or more employees or an employee who is chosen by an employer to set up a tracking system for tracking one or more employees. Alternatively, the creator of the relationship might be a person that wants to track one or more family members (e.g., children).

In response to the request, in step 553, the machine of the creator of the relationship may receive and/or opens a page (of an application or a website) requesting information about the participants in the tracking relationship (see step 504 in FIG. 5A), such as contact information. The page may have fillable fields for the information. The page may also have optional settings that may be chosen for the tracking relationship.

In an embodiment, in step 554, the machine of the creator of the tracking relationship sends sufficient information about the one or more participants, via the webpage or application page filled out in step 552, so that the participants that are identified, can be contacted, and to provide sufficient access to the server system for the tracking to take place. In one embodiment, information about the participant may be automatically filled out by the participants as a part of accepting employment.

In an embodiment, the trackee may already have a page on a mash guide, such as a result of being an attendee of a meeting (which may have been set up as part of setting up a meeting with the meeting planner) or an owner of an establishment that is on the mash guide, in which case, the creator of the relationship may just need to the participant a link to a page of the mash guide.

In response to providing the information to the server, the machine of the creator of the relationship may receive a confirmation that the trackee information is correct and/or that the trackee accepts the invitation. At the same time or separately, the machine of the creator of the relationship may receive from the server a request for more information about the rules surrounding the tracking relationship. If the server does not receive more information from the server, the server may use default rules to set up the tracking the relationship in which the person being tracked is only tracked when the person being trackee is on (is locatable by) the proximity grid.

Optionally, in steps 556-558, the machine of the creator of the tracking relationship responds to the request by sending further information about tracking to the server. For example, in step 556, in response to the request from the server, the machine of the creator of the tracking relationship provides information about the preferences for tracking. In step 558, the machine of the creator of the tracking relationship may provide rules and/or an expiration date for ending the tracking. The rules may be provided on a fillable page sent from the server. The fillable page may include one or more default options. For example, a default option of "employee" may include typical rules for tracking an employee (which may be provided to the creator of the relationship on the page). In at least one embodiment, the rules and/or expiration can be at least partially provided by the tracker and the trackee's machines. The expiration may by default be when the employee/employer relationship is severed.

In at least one embodiment, the machine of the creator of the tracking relationship may set up a tracking system that is automatically accepted by an employee upon employment. Optionally, upon employment, the employee may be given a unrequired option for specifying rules of when, where, how, the tracking may take place.

In at least one embodiment, the machine of the creator of the tracking relationship may communicate the setup of a tracking system for a single event, such as a meeting. In this way the creator can track the location of all of the participant's machines and/or set up changes to the location, time, etc. of the meeting. The creator can help any participant that is lost or cannot find the location of the meeting, and/or two friends or partners can track each other's whereabouts in case the friends or partners need to meet in the middle of the meeting.

In at least one embodiment, the machine of the creator of the tracking relationship may set up a tracking system that only occurs when the participant's machines are "on the proximity grid," such as when the participant's machine is locatable by the tracking service or proximity grid as a result of the participant indicating that the participant is currently open to being tracked.

In at least one embodiment, the machine of the creator of the tracking relationship may send instructions to the system to invite the one or more participants to accept the tracking. In at least one embodiment, the creator's machine may send instructions to the system to provide the one or more participants with the option to contribute to the rules of the tracking.

In step 560, optionally, the machine of the creator of the tracking relationship receives acknowledgement from the server about whether the one or more machines of people that have accepted the invitation to be tracked. Optionally, if one or more of the trackees refuses to be tracked, the system may send the machine of the creator of the tracking relationship an indication of the response.

In an embodiment, although depicted as distinct steps in FIG. 5B, step 552-560 may not be distinct steps. In other embodiments, method 550 may not have all of the above steps and/or may have other steps in addition to or instead of those listed above. The steps of method 550 may be performed in another order. Subsets of the steps listed above as part of method 550 may be used to form their own method.

Setup—Invitee Method

Figure 6A:
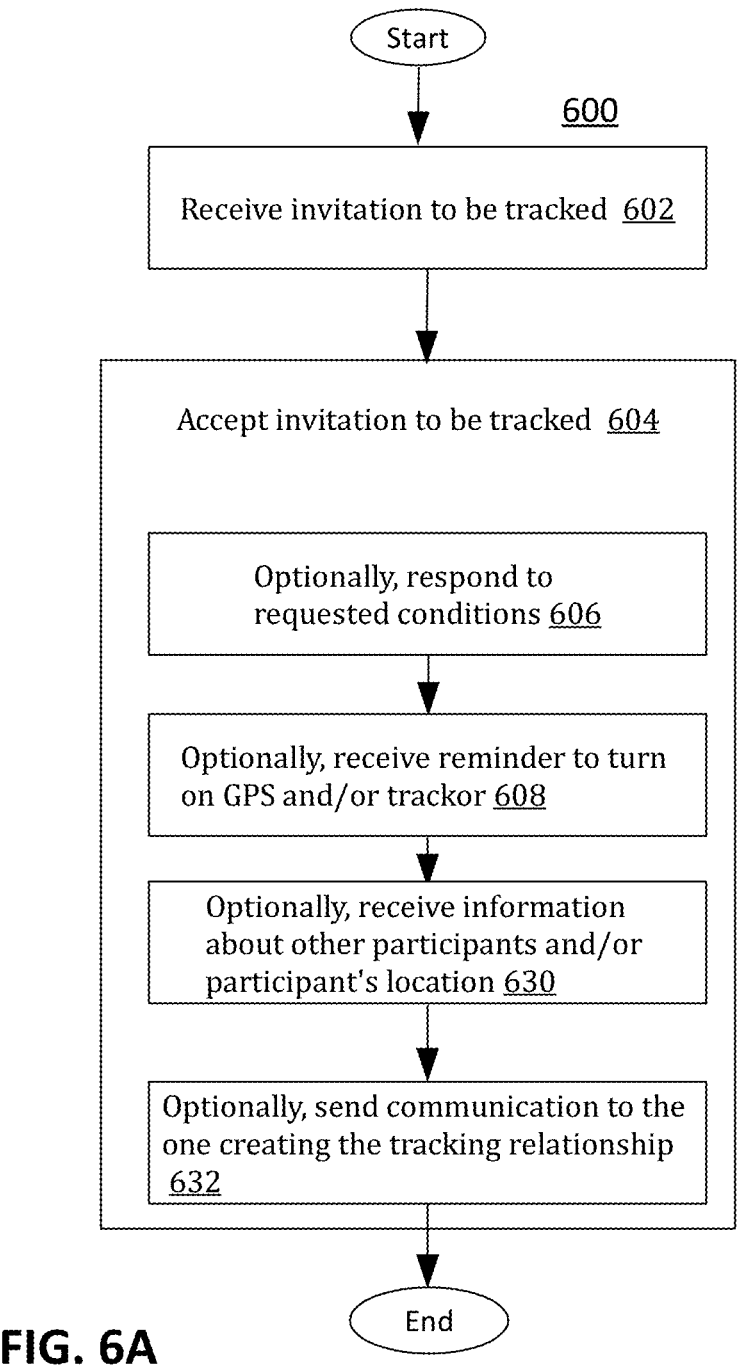
FIG. 6A shows a flowchart of an embodiment of establishing a tracking relationship from the perspective of the machine of an invitee.

FIG. 6A shows a flowchart of an embodiment of method 600 of setting up a tracking relationship from the perspective of the participant receiving the invitation.

In step 602, the participant receives an invitation to join a tracking relationship at the participant's machine. The invitation may be received, via email, website, text, or other methods. The invitation may cause a webpage to be received by the participant's machine or information may be received causing a page of an application to be displayed and populating portions of the page of the application, inviting the participant to join a tracking relationship. The page may also provide instructions as to how the participant may specify optional conditions and/or rules and/or expiration of the tracking relationship, which the participant is not required to fill out.

In step 604, the participant's machine sends an acceptance of the invitation to the server (if desired). The participant's machine may send the acceptance by responding to an email, sending a text message, via a mobile phone, and/or by interacting with a server, via an app or a browser. Steps 606-612 may be sub-steps of step 604.

In step 606, optionally, if there are conditions for the tracking relationship requested by the creator of the relationship, the participant may be provided with a way to choose to accept the conditions, to choose not to accept the conditions, and/or to suggest modifications of the conditions and other conditions, if the participant receiving the invitation desires. The participant may also choose to refuse the conditions (e.g., by just filling in a single check box or other yes/no field) and thereby only be trackable when the participant in on the proximity grid (thereby allowing the participant receiving the invitations to easily enter into the tracking relationship without filling out lots of pages/fields of options even though the one that sent the invitation chose to fill in many options that the one receiving the invitation does not agree to). The participant may respond to conditions involving times, dates, and days that the participant is automatically "on the proximity grid." The participant's machine may be provided with a fillable page on which the participant may provide responses and/or alternatives to any of the rules regarding the tracking. The responses may then be sent by the participant's machine to the server (and the server may send the conditions and rules chosen by the participant receiving the invitation allowing the participant that sent the invitation to respond).

Figure 6B:
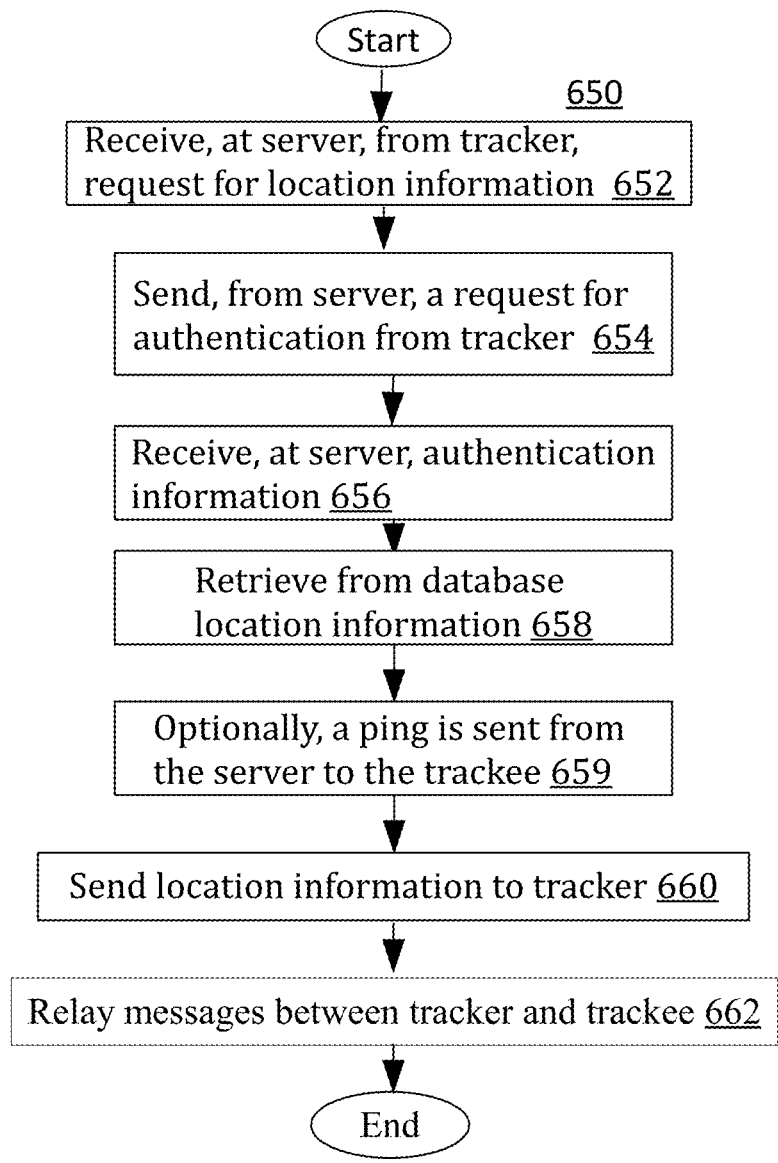
FIG. 6B shows a flowchart of an embodiment of tracking, via being pinged, from the perspective of the machine of the one being tracked.

Alternatively, the participant receiving the invitation may choose to only be trackable by being pinged (e.g., while on the proximity grid) for further tracking information (see FIG. 6B).

In at least one embodiment, the response sent from the participant's machine can be used by the system to set up the tracking. In other words, one or more of the participant's responses may be used to configure the module for the tracking system.

In step 608, optionally, if the one receiving the invitation is the trackee, a request may be received on the participant's machine reminding the participant to turn on the GPS or other module for determining locations on the electronic device that is carried with the participant, during periods that the participant is being tracked. Optionally, if the participant chooses, the participant may communicate location information via another method (e.g., text, email, telephone, website, or photograph), instead of using GPS or another type location determination module.

In step 610, the participant's machine may optionally receive information about others participating in the tracking relationship.

In step 612, the participant may optionally send a communication to the creator of the tracking relationship and/or the other participants indicating acceptance of the invitation (e.g., the message may be sent via the server of or sent directly). Step 612 differs from step 604, in that in step 604 the acceptance is sent to the server for the server, so that the server has the information to set up the relationship, whereas in step 612, the acceptance is sent to the creator of the relationship.

In an embodiment, although depicted as distinct steps in FIG. 6A, step 602-612 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Implementing Tracking—Server

FIG. 6B is a flowchart of an embodiment of a method 650 of implementing tracking from the perspective of the server.

In step 652, the server receives a request from the tracker's machine for location information of a trackee's machine. The request may be in the form of an email, a text, a telephone call, or an activate-able button on the website.

In step 654, the server sends a request for authentication information (e.g., a password or digital certificate).

In step 656, in response, the server receives authentication information. The request of authentication information may be accompanied by a message for the trackee.

In step 658, if the authentication information is authenticated, the server accesses a database, and retrieves location information of the trackee. If the trackee is on the proximity grid, the location information will be current (unless the location information is only available by pinging the trackee). If the tracking information is only available by being pinged, an indication of the pinging requirement may be stored in the database and retrieved from the database.

In optional step 659, if current location information is only available by ping, a ping is sent to the trackee.

In step 660, if the trackee is on the proximity grid, current location information retrieved is provided to the tracker. The location of the person being tracked (the location of the trackee's machines) is provided to the tracker's device. The information may be provided in the form of invent stamp information and/or a website or page having the locations on a map. Alternatively, the locations may be provided in another form (e.g., an email, a text, a telephone call, etc.).

In step 662, optionally the server relays messages between the tracker and trackee.

In an embodiment, although depicted as distinct steps in FIG. 6, step 652-662 may not be distinct steps. In other embodiments, method 650 may not have all of the above steps and/or may have other steps in addition to or instead of those listed above. The steps of method 650 may be performed in another order. Subsets of the steps listed above as part of method 650 may be used to form their own method.

Implementing the Tracking—Tracker's Machine

Figure 7:
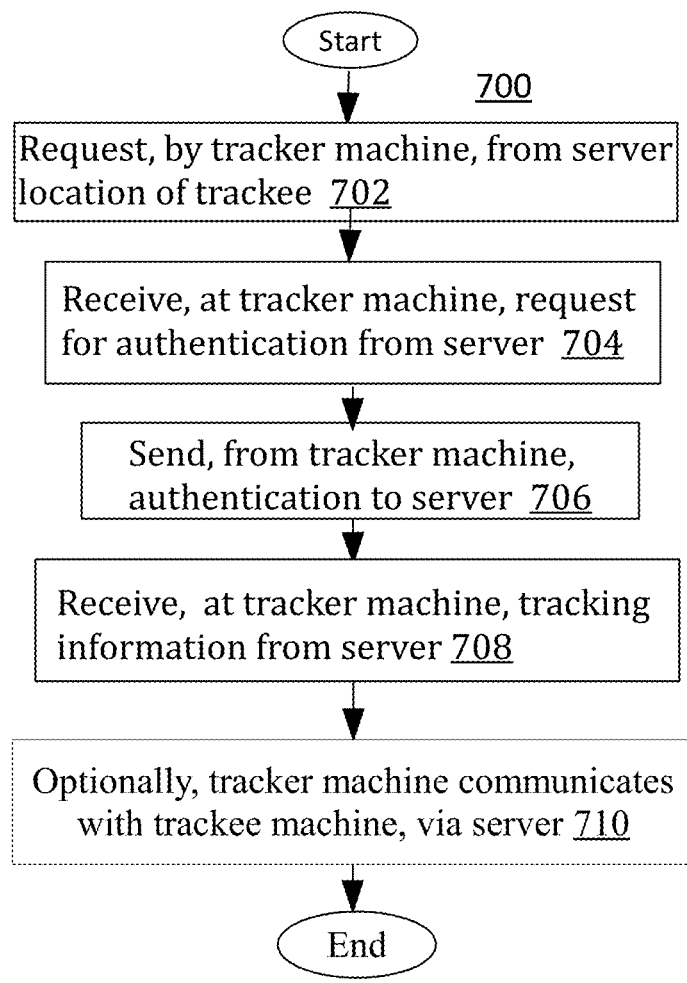
FIG. 7 shows a flowchart of an embodiment of tracking from the perspective of the machine of the tracker.

FIG. 7 shows a flowchart of an embodiment of a method 700 of implementing the tracking, which is from the perspective of the tracker's machine (e.g., a mobile phone).

In step 702, a message is sent, from the tracker's machine to the server, where the message includes a request for information about the location of each of the trackee's machines. The request may be in the form of an email, a text, a telephone call, or an activating button or link on a website, for example.

In step 704, the tracker's machine receives a request for authentication information.

In step 706, the tracker machine sends the authentication information (e.g., a password, digital certificate). Optionally, such as ping and/or another message, a message may be sent by the tracker via the server to the trackee.

In step 708, in response, the tracker receives the location information of at least one person on the tracker's machine from the server or if the location information is only available by pinging the tracker may receive a response to a ping. If the trackee is not connected to the grid, the tracker may only receive a message that location information is not currently available or that the trackee does not want to be tracked at the current time (unless the trackee chose to make tracking information available even when the trackee is not on the proximity grid). Optionally, even when the trackee is not on the proximity grid, prior tracking information may still be accessible (even though current tracking information is not accessible). The location information may be provided as a map, a textual explanation, a photograph, and/or an audio message.

Optionally, other information about the location of the trackee's machine is received, from the server, at the tracker's machine. The other information may be received in the form of event stamp information. The other information may include any information about the location, including, the address, information about the type of location (e.g., building name, restaurant name, store name), the contact information for the location, and the website of the location. Contact information may be provided for the location, which may allow the tracker to contact the trackee if the trackee's phone is not turned on.

In step 710, optionally, the tracker may receive a message from the trackee in response to the request for tracking information. Also as part of step 710, optionally, in response to receiving the tracking information, the tracker's machine may send a communication (e.g., via the server) to the machine(s) of one or more person(s) being tracked. The tracker may use any method of communication, including email, website, telephone, text, for example. The tracker and the trackee may exchange messages, via the server.

In an embodiment, although depicted as distinct steps in FIG. 7, step 702-710 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Implementing the Tracking—Trackee's Machine

Figure 8:
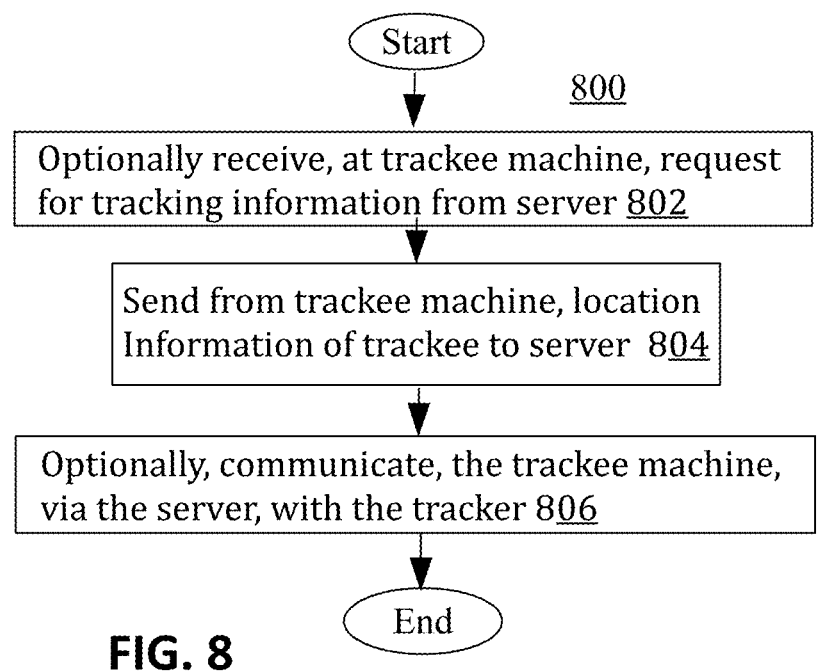
FIG. 8 is a method of implementing the tracking from the perspective of the trackee's machine (e.g., mobile phone).

FIG. 8 is a method 800 of implementing the tracking from the perspective of the trackee's machine (e.g., a mobile phone).

In optional step 802, the trackee machine receives a ping from the server. For example, in step 802, the trackee may receive a request for tracking information.

In step 804, the trackee sends location information of the person being tracked (the location of the trackee's machines) to the server. The trackee may send location information on a periodically and/or automatically, while the trackee is on the proximity grid. In an embodiment, the location of the person being tracked is provided by providing the location information of the person's trackable devices. The tracking information may be provided by sending a stream of event stamps. Alternatively, the locations may be provided in another form (e.g., an email, a text, a telephone call, etc.). If the trackee is only available by being pinged, the location information may be in response to a ping. Other information may be provided by activation of the event stamp. The other information may include any information about the location, including, the address, information about the type of location (e.g., building name, restaurant name, store name), the contact information for the location, and the website of the location. Contact information may be provided for the current location of the trackee, allowing the tracker to contact the participant if the trackee's mobile phone is not working or mobile phone is not turned on.

In optional step 806, the trackee's machine communicates (e.g., via the server) with the tracker and the tracker's machine communicates (e.g., via the server) with the trackee.

In summary, in method 800, if the trackee has chosen to be only be trackable by being pinged, the trackee receives a ping and then determines how to respond, depending on the amount of tracking information the trackee is comfortable with sharing. Optionally, if the trackee has decided to be off the proximity grid, then the tracker is not provided, by the server, with a way to pinging the trackee. In contrast, if the trackee decided to be tracked without being pinged, the trackee sends tracking information automatically and/or periodically (unless the trackee has decided to be off the proximity grid in which case current tracking information is not available), and then the tracker can view the tracking information when desired, and when available. Whether the trackee has decided to be trackable by being pinged or without being pinged, in response to the trackee receiving a request for tracking information, communications may be established by the trackee or tracker and messages may be sent by the tracker and trackee to one another.

In an embodiment, although depicted as distinct steps in FIG. 8, step 802-816 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Alternatives and Extensions

In general, each of the embodiments and each aspect of each embodiment disclosed in this specification may be used together in any combination or separately from one another. Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
receiving, at a server system, a request, from a machine of a first person, for tracking information associated with the location of a second person, the server system including one or more processors and a memory system;
determining, by the processor system, whether the second person is on a proximity grid, the proximity grid being a database storing identifiers of at least people correlated with locations of the people, where the second person is considered to be on the proximity grid, when the second person is currently locatable by information stored in the database; and
when the second person is on the proximity grid,
retrieving, by the server, current tracking information, and
sending, by the server, current tracking information in response to the request;
wherein the second person is provided with an option of not being trackable by getting off the grid, so that the second person being tracked has control of when the second person is trackable, when setting up a tracking relationship, without requiring the second person to specify when the second person is trackable.

2. The method of claim 1, further comprising:
receiving at the server from a machine of the second person being tracked current tracking information associated with the second person's current location, while the second person is on the proximity grid, and
storing the current tracking information in the database.

3. The method of claim 1, further comprising:
receiving at the server, a request to setup a tracking relationship;
sending, by the server, a request for contact information from the second person needed for setting up the tracking relationship, without requiring the person to specify when the second person is trackable.

4. The method of claim 1, further comprising:
sending a request, by the server, for authentication information to the machine of the first person; and
in response to sending the request for authentication information, receiving, at the server, the authentication information; and
the sending of the current tracking information being in response to receiving of the authentication information in addition to being in response to the request for the current tracking information.

5. The method of claim 1, the current tracking information including a current time with a current location of the second person.

6. The method of claim 1,
the database storing identifiers of locations of objects correlated with locations of the objects and further information about the objects; and
the server storing one or more machine instructions for retrieving the information about the objects ranked according to distance from a location of user that requested the information.

7. The method of claim 1, further comprising:
receiving, at the server, a request from a machine of a third person, for tracking information of a fourth person;
in response, searching the database for tracking information associated with the fourth person;
retrieving an indication to ping the fourth person prior to sending tracking information to the third person; and
in response to retrieving the indication to ping the fourth person sending a request to the fourth person for location information.

8. The method of claim 7, further comprising:
in response to the sending of the request to the fourth person for location information, receiving from the machine of the fourth person current location of fourth person.

9. The method of claim 1, the server storing a downloadable application, the downloadable application including one or more machine instructions, which when implemented by a user device cause a processor system of the user device to implement a user-device-implemented method comprising:
collecting event information, by the user device, the event information being associated with a location of the user device;
sending the event information, by the user device, to the server, in association with the tracking relationship.

10. The method of claim 9,
detecting that the user device changed location;
the collecting of the event information and the sending of the event information occurring in response to the detecting.

11. The method of claim 9,
the collecting of the event information and the sending of the event information occurring automatically on a periodic basis.

12. The method of claim 9, user-device-implemented method further comprising:
in response to receiving, at the user device, an invitation to join a tracking relationship, causing the user machine to display one or more fields, via which the user indicates whether the invitations is accepted, and sending the choice to the server.

13. The method of claim 1 further comprising, prior to the retrieving, by the server, current tracking information, sending a request to a device of the second person for location information, and in response receiving event stamp information generated by an event stamp function on the device of the second person, the event stamp information including current location information, the event stamp function being manually activatable by the second person pushing a physical button or selecting link provided on the interface of the device of the second person.

14. The method of claim 1 further comprising, prior to the retrieving, by the server, current tracking information, sending a request to a device of the second person for location information, and in response receiving event stamp information generated by an event stamp function on the device of the second person, the event stamp information including current contact information, the event stamp function being manually activatable by the second person pushing a physical button or selecting link provided on the interface of the device of the second person.

15. The method of claim 1, wherein the second person getting off the gird includes the server receiving a notification that the second person is getting off the grid and the server ceasing to communicate with the device of the second person about the current location of the second person and receiving communications from the second person while the second person is off the grid.

16. The method of claim 15, wherein being on the grid includes receiving communications at the server updating the server of location changes when location changes occur.

17. The method of claim 15, wherein being on the grid includes receiving communications at the server updating the server of location changes periodically, so as to ensure that the location stored at the server is current.

18. The method of claim 1, wherein the first person has a tracking relationship with the second person that was established, via the server, prior to receiving the request for current tracking information.

19. The method of claim 1, further comprising
prior to receiving the request for tracking information from the first person, sending information causing the device of the second person to offer a choice to the second person as to whether to ping the second person for tracking information that requires a manual response by the second person, when a request for tracking information is received and whether to automatically provide current tracking information in response to a request for current tracking information.

20. A method comprising:
receiving at a user device an invitation to join a tracking relationship, the user device including a processor system having at least one processor and memory system; and
in response to the receiving the invitation, sending, by the user device, an acceptance to be in the tracking relationship;
activating, by the processor system, a function that collects and sends location information;
sending information, by the user device to the server, indicating that the user device is locatable, via a proximity grid, the proximity grid being a network of entities that are searchable based on the location and the entities and the distance of the entities from the searcher;
at a later time, sending, by the user device, information indicating that the user device is not locatable, via the proximity grid, therein blocking the user device from being tracked.

21. A method comprising:
receiving, at a server system, a request, from a machine of a first person, for current tracking information associated with the location of a second person, the second person being an individual with which the first person has a tracking relationship that was established prior to receiving of the request, the server system including one or more processors and a memory system;
determining, by the processor system, whether the second person is currently on a proximity grid, the proximity grid being a database storing identifiers of at least people correlated with locations of the people, where the second person is considered to be on the proximity grid, when the second person is currently locatable by information stored in the database and a device of the second person is in communication with the server; and
when the second person is on the proximity grid,
retrieving, by the server, current tracking information, and
sending, by the server, the current tracking information in response to the request;
wherein the second person is provided with an option of not being trackable by getting off the grid, so that the second person being tracked has control of when the second person is trackable, when setting up a tracking relationship, without requiring the second person to specify when the second person is trackable, the second person getting off the grid includes the server receiving a notification that the second person is getting off the grid and the server ceasing to communicate with the device of the second person about the current location of the second person and ceases receiving communications from the second person while the second person is off the grid.

\* \* \* \* \*